United States Patent
Ishikawa et al.

(10) Patent No.: US 6,463,098 B1
(45) Date of Patent: Oct. 8, 2002

(54) DATA TRANSFER CIRCUIT TRANSFERRING 2-BIT DATA THROUGH 4 DATA LINES

(75) Inventors: Masatoshi Ishikawa; Hiroaki Tanizaki, both of Hyogo (JP)

(73) Assignees: Mitsubishi Denki Kabushiki Kaisha, Tokyo (JP); Mitsubishi Electric Engineering Company Limited, Tokyo (JP)

( * ) Notice: Subject to any disclaimer, the term of this patent is extended or adjusted under 35 U.S.C. 154(b) by 0 days.

(21) Appl. No.: 09/298,949

(22) Filed: Apr. 26, 1999

(30) Foreign Application Priority Data

May 1, 1998 (JP) ..................... 10-122356(P)

(51) Int. Cl.[7] .................. H03H 7/30; H04B 3/00
(52) U.S. Cl. ...................... 375/229; 375/257
(58) Field of Search ................ 375/219, 220, 375/229, 257, 377; 333/18, 28 R, 100

(56) References Cited

U.S. PATENT DOCUMENTS 6,028,791 A * 2/2000 Tanaka ............... 365/185.2

6,320,778 B1 * 11/2001 Tanaka et al. ........ 365/230.09

FOREIGN PATENT DOCUMENTS

JP      6-5077      1/1994

* cited by examiner

Primary Examiner—Don N. Vo
(74) Attorney, Agent, or Firm—McDermott, Will & Emery

(57) ABSTRACT

A data transfer circuit including four data lines is provided. In the data transfer circuit, a first driver pulls one of two data lines equalized to an "H" level by a first equalizer to an "L" level for transmitting first data. A second driver pulls one of two data lines equalized to an "L" level by a second equalizer to an "H" level for transmitting second data. A selector connects the two data line pulled to an "H" level to the first driver and the first equalizer and the two data lines pulled to an "L" level to the second driver and the second equalizer. Therefore, equalizing operation can be performed at a high speed and with reduced power consumption.

7 Claims, 19 Drawing Sheets i=2 i=3,4,1 i=3 i=4,1,2 i=4 i=1,2,3

FIG. 19 PRIOR ART
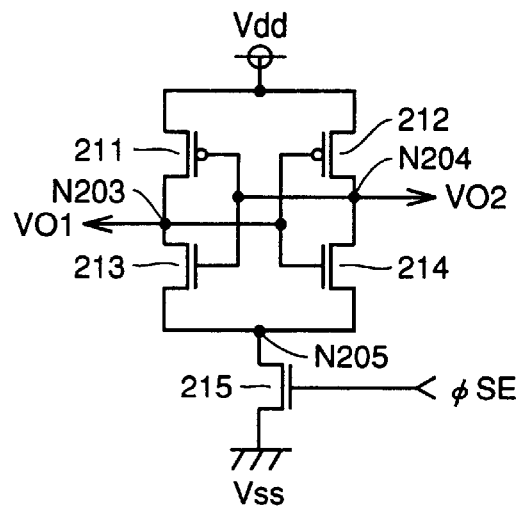
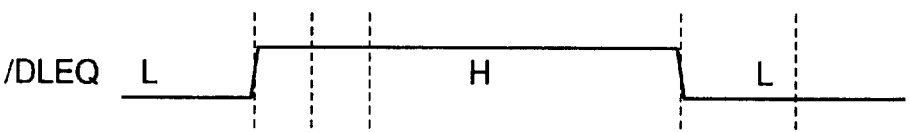
FIG. 20A /DLEQ
PRIOR ART
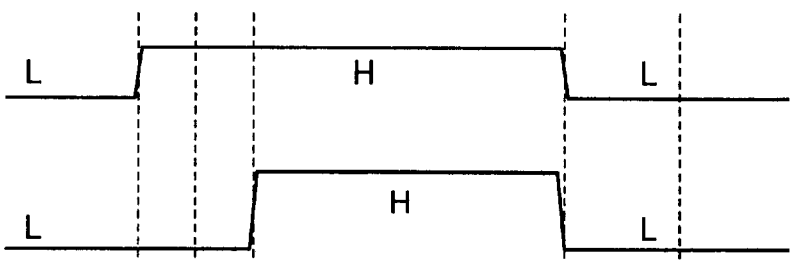
FIG. 20B φSE
PRIOR ART
FIG. 20C S1
PRIOR ART
FIG. 20D S2
PRIOR ART
FIG. 20E DL1
PRIOR ART
FIG. 20F DL2
PRIOR ART
t0 t1 t2 t3 t4
TIME t →

US 6,463,098 B1

DATA TRANSFER CIRCUIT TRANSFERRING 2-BIT DATA THROUGH 4 DATA LINES

BACKGROUND OF THE INVENTION

1. Field of the Invention

The present invention relates generally to data transfer circuits, and more particularly, to a data transfer circuit which transfers first and second data from a transmitting side circuit to a receiving side circuit.

2. Description of the Background Art

There are known conventional methods for internally transferring data in a semiconductor integrated circuit device, according to which a transmitting side circuit and a receiving side circuit are connected by a data line and voltage on the data line is changed by the transmitting side circuit for transferring data to the receiving side circuit. If data is thus transmitted by the voltage change on the single data line, however, noise affects the data line, which prevents the receiving side from determining the data to be received until voltage change equal to or greater than the level of the noise is obtained.

Therefore, in general, the transmitting side circuit and receiving side circuit are connected by two data lines provided in parallel, and the receiving side circuit is provided with a differential amplifier to amplify the potential difference between the data lines. According to this method, noise substantially equally affects the two data lines and the influence of the noise can be cancelled by taking the potential difference between the data lines. As a result, this method permits reception data to be determined with the voltage change between the data lines at a smaller level, faster data transfer than the data transfer method using the single data line can be achieved. This method however requires an equalizing operation before data transfer to bring the two data lines to the same potential level in order to compare the potentials of the two data lines.

FIG. 18 is a circuit block diagram of a conventional data transfer circuit using two data lines DL1 and DL2 and a sense amplifier SA, a kind of differential amplifier.

Referring to FIG. 18, in the data transfer circuit, the output nodes N201 and N202 of drivers 201 and 202 included in a data transmitting circuit TR and the input/output nodes N203 and N204 of sense amplifier SA included in the data receiving circuit are connected by data lines DL1 and DL2, respectively, and an equalizer EQ is provided between data lines DL1 and DL2.

Drivers 201 and 202 drive data lines DL1 and DL2 according to internal signals S1 and S2 based on transmission data, respectively. Equalizer EQ includes a P-channel MOS transistor 203 connected between data lines DL1 and DL2, and P-channel MOS transistors 204 and 205 connected in series between data lines DL1 and DL2. P-channel MOS transistors 203 to 205 receive together a data line equalize signal /DLEQ at their gates. Power supply potential Vdd is applied to the node between P-channel MOS transistors 204 and 205. When signal /DLEQ attains an "L" level, P-channel MOS transistors 203 to 205 conduct so that data lines DL1 and DL2 are equalized to power supply potential Vdd.

Sense amplifier SA includes P-channel MOS transistors 211 and 212 and N-channel MOS transistors 213 to 215 as shown in FIG. 19. P-channel MOS transistors 211 and 212 are connected between lines to power supply potential Vdd and input/output nodes N203 and N204, respectively, and have their gates connected to the input/output nodes N204 and N203, respectively. N-channel MOS transistors 213 and 214 are connected between input/output nodes N203 and N204 and node 205, respectively and have their gates connected to input/output nodes N204 and N203, respectively. N-channel MOS transistor 215 is connected between node N205 and a line to a ground potential Vss and receives a sense amplifier activation signal φSE at its gate. The potentials of input/output nodes N203 and N204 become output signals VO1 and VO2.

Sense amplifier SA is activated in response to sense amplifier activation signal φSE attaining an "H" level, and brings the node at the higher potential between input/output nodes N203 and N204 to power supply potential Vdd ("H"level) and brings the node at the lower potential to ground potential Vss ("L"level). Thus, the potential difference between input/output nodes N203 and N204 is amplified to power supply voltage Vdd.

FIGS. 20A to 20F are timing charts illustrating the operation of the data transfer circuit shown in FIGS. 18 and 19. Referring to FIGS. 20A to 20F, in an initial state, data line equalize signal /DLEQ is at an "L" level so that equalizer EQ is activated, and the potentials of data lines DL1 and DL2 are equalized to an "H" level. Sense amplifier activation signal φSE attains an "L" level and sense amplifier SA is inactivated. Internal signals S1 and S2 are both at an "H" level.

At time t0, data line equalize signal /DLEQ attains an "H" level, which turns off P-channel MOS transistors 203 to 205 in equalizer EQ, so that data transfer is enabled. Subsequently, at time t1, one of internal signals Si and S2 (S1 in the figure) attains an "L" level. Driver 201 attempts to pull data line DL1 to an "L" level, but the capacitance and resistance values of data line DL1 are large, and therefore the potential of data line DL1 gradually decreases.

At time t2, at which the potential difference between data lines DL1 and DL2 may be sensed and amplified by sense amplifier SA, sense amplifier activation signal φSE attains an "H" level, which turns on N-channel MOS transistor 215 in sense amplifier SA to activate sense amplifier SA. Thus, the potentials of data lines DL1 and DL2, in other words the output signals VO1 and VO1 of sense amplifier SA rapidly attain an "L" level and an "H" level, respectively, so that the data transfer ends.

After the data transfer, at time t3, signals /DLEQ and φSE are pulled to an "L" level and signals S1 and S" are pulled to an "H" level, thus equalizing data lines DL1 and DL2 to be ready for the next data transfer.

In the conventional data transfer circuit, however, after the equalizing operation is started at time t3, it takes a long period until the potentials of data lines DL1 and DL2 are completely pulled to the level of precharge potential Vdd, and during that period, the next data cannot be transmitted. If data lines DL1 and DL2 are long, the resistance and capacitance of the interconnections are large, and the time required for equalizing increases as a result. The interconnections are charged by equalizing, and therefore the power consumption increases if the data lines are longer.

SUMMARY OF THE INVENTION

It is therefore a main object of the present invention to provide a transfer circuit which permits the equalizing period and power consumption to be reduced.

Briefly stated, a transmitting circuit provides a potential difference between two data lines equalized to a first reference potential for transmitting first data and a potential difference to two data lines equalized to a second reference potential for transmitting second data. After the data transfer, a selecting circuit selects two data lines at potentials closer to the first reference potential as a first group and the other two data lines as a second group, and first and second equalizers equalize the first and second groups to the first and second reference potentials, respectively. The difference between the potential of a data line after the data transfer and the potential of the data line after the equalizing is smaller than the conventional case in which equalizing is performed regardless of the potentials of the data lines after the data transfer. Consequently, the equalizing period and power consumption can be reduced.

Preferably, the transmitting circuit pulls one of the two data lines equalized to the first reference potential to the second reference potential for transmitting the first data, and pulls one of the two data lines equalized to the second reference potential to the first reference potential for transmitting the second data. In this case, there is no potential difference between the potential of a data line after the data transfer and the potential of the data line after the equalizing, so that the equalizing period and power consumption can be even more reduced.

Also preferably, there are further provided a first amplifying circuit which amplifies a potential difference provided between the two data lines equalized to the first reference potential to pull one of the two data lines to the second reference potential and the other to the second reference potential and a second amplifying circuit which amplifies a potential difference provided between the two data lines equalized to the second reference potential to pull one of the two data lines to the first reference potential and the other to the second reference potential. In this case, since the difference between the potential of a data line after the data transfer and the data line after the equalizing is eliminated, the equalizing period and power consumption can be further reduced. The potential of the data lines can be changed at a high speed, and therefore the data transfer speed can be improved.

Also preferably, there are provided a first selecting circuit which selects one data line at the same potential as a predetermined data line, and a second selecting circuit which selects as a first group the predetermined data line if the data line is at the first reference potential together with the data line selected by the first selecting circuit and the other two data lines as a second group, and selects as a second group the predetermined data line if the data line is at the second reference potential together with the data line selected by the first selecting circuit and the other two data lines as a first group. Thus, the selecting circuit can be readily implemented.

Also preferably, the transmitting circuit includes first and second output nodes to transmit first data and third and fourth nodes to transmit second data, the receiving side circuit includes first and second input nodes to receive first data and third and fourth input nodes to receive second data, a first equalizer is coupled to the first and second input nodes, and a second equalizer is coupled to the third and fourth input nodes. A coupling circuit includes a first coupling circuit which couples respective one ends of the two data lines in the first group with the first and second output nodes, and respective one ends of the two data lines in the second group to the third and fourth output nodes, and a second coupling circuit which couples respective the other ends of the two data lines in the first group to the first and second input nodes, and respective the other ends of the two data lines in the second group to the third and fourth output nodes. Thus, the coupling circuit can be readily implemented.

Also preferably, the first coupling circuit includes a plurality of clocked inverters, and the second coupling circuit includes a plurality of transfer gates. In this case, the load of the transmitting circuit is alleviated by thus providing the clocked inverters.

The second coupling circuit includes first to fourth transfer gates provided corresponding the data lines and connected between the other ends of corresponding data lines and the first to fourth input nodes, respectively. The selecting circuit includes a storing circuit which stores information on which one of the first and fourth transfer gates conducts, and a control circuit which selects one of the first to fourth transfer gates based on the information stored by the storing circuit and the transferred first and second data. In this case, since the data lines and the receiving side circuit can be coupled by one stage of transfer gates, the load of the transmitting circuit can be alleviated.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 19 is a circuit diagram of the sense amplifier shown in FIG. 18; and

FIGS. 20A to 20F are timing charts for use in illustration of the operation of the data transfer circuit shown in FIG. 18.

DESCRIPTION OF THE PREFERRED EMBODIMENTS

First Embodiment

Figure 1:
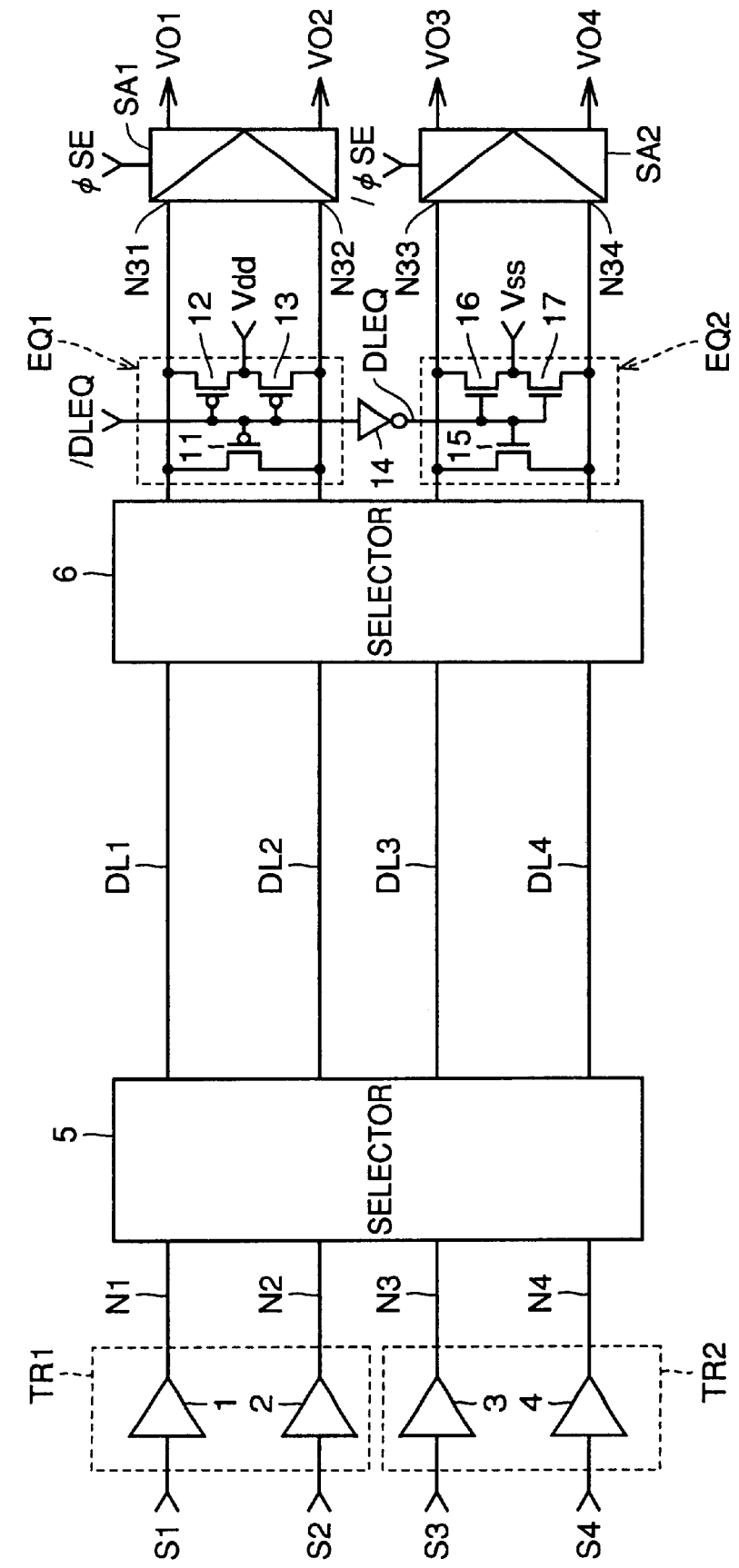
FIG. 1 is a block diagram of a data transfer circuit in a semiconductor integrated circuit device according to a first embodiment of the present invention.

FIG. 1 is a circuit block diagram of a data transfer circuit in a semiconductor integrated circuit device according to a first embodiment of the present invention.

Referring to FIG. 1, the data transfer circuit transfers 2-bit data using 4 data lines DL1 to DL4. If a plurality of such data transfer circuits are provided, even bit data can be transferred.

One end of each of data lines DL1 to DL4 is connected to data transmitting circuits TR1 and TR2 through a selector 5; and the other end of each of data lines DL1 to DL4 is connected to sense amplifiers SA1 and SA2 through a selector 6. An equalizer EQ1 is provided between the input/output nodes N31 and N32 of sense amplifier SA1, and an equalizer EQ2 is provided between the input/output nodes N33 and N34 of sense amplifier SA2.

Data transmitting circuit TR1 includes drivers 1 and 2 and transmits data to sense amplifier SA1 through two data lines selected by selectors 5 and 6 among the four data lines DL1 to DL4. Internal signals S1 and S2 input to drivers 1 and 2 both attain an "L" level during an equalizing period, and one of the signals attains an "L" level during a data transfer period based on transmission data.

Data transmitting circuit TR2 includes drivers 3 and 4 and transmits data to sense amplifier SA2 through two data lines selected by selectors 5 and 6 among the four data lines DL1 to DL4. Internal signals S3 and S4 input to drivers 3 and 4 both attain an "L" level during an equalizing period, and one of the signals attains an "H" level during a data transfer period based on transmission data.

Equalizer EQ1 includes a P-channel MOS transistor 11 connected between the input/output nodes N31 and N32 of sense amplifier SA1 and P-channel MOS transistors 12 and 13 connected in series between input/output nodes N31 and N32. The gates of P-channel MOS transistors 11 to 13 receive together a data line equalize signal /DLEQ. The node between P-channel MOS transistors 12 and 13 is provided with a power supply potential Vdd. When data line equalize signal /DLEQ attains an "L" level, P-channel MOS transistors 11 to 13 conduct, and two data lines selected by selectors 5 and 6 among the four data lines DL1 to DL4 are equalized to power supply potential Vdd.

Equalizer EQ2 includes an N-channel MOS transistor 15 connected between the input/output nodes N33 and N34 of sense amplifier SA2 and N-channel MOS transistors 16 and 17 connected in series between input/output nodes N33 and N34. The gates of N-channel MOS transistors 15 to 17 receive together a data equalize signal DLEQ. Signal DLEQ is a signal produced by inverting signal /DLEQ using an inverter 14. The node between N-channel MOS transistors 16 and 17 is provided with a ground potential Vss. When data equalize signal DLEQ attains an "H" level, N-channel MOS transistors 15 to 17 conduct and two data lines selected by selectors 5 and 6 among the four data lines DL1 to DL4 are equalized to ground potential Vss.

Figure 2A:
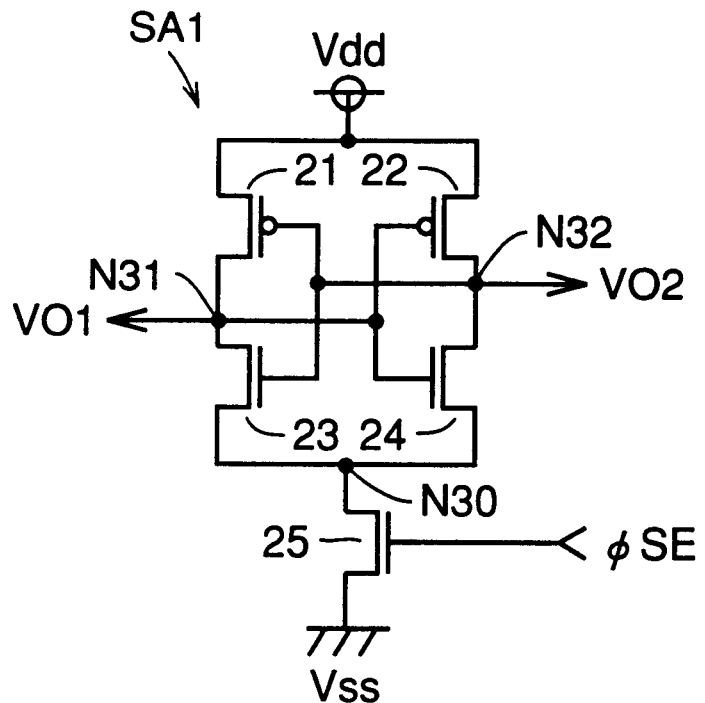
FIGS. 2A and 2B are circuit diagrams each showing the sense amplifier shown in FIG. 1.

Sense amplifier SA1 includes P-channel MOS transistors 21 and 22 and N-channel MOS transistors 23 to 25 as shown in FIG. 2A. P-channel MOS transistors 21 and 22 are connected between lines to power supply Vdd and input/output nodes N31 and N32, respectively, and have their gates connected to input/output nodes N32 and N31, respectively. N-channel MOS transistor 23 and 24 are connected between input/output nodes N31 and N32 and node N30 and have their gates connected to input/output nodes N32 and N31, respectively. N-channel MOS transistor 25 is connected between node N30 and the line to ground potential Vss and receives a sense amplifier activation signal φSE at its gate. The potentials at N31 and N32 become the output signals VO1 and VO2 of sense amplifier SA1.

Sense amplifier SA1 is activated in response to sense amplifier activation signal φSE attaining an "H" level and pulls the node at the higher potential between input/output nodes N31 and N32 to power supply potential Vdd ("H" level), and the node at the lower potential to ground potential Vss ("L" level). Thus, the potential difference between input/output nodes N31 and N32 is amplified to power supply voltage Vdd.

Figure 2B:
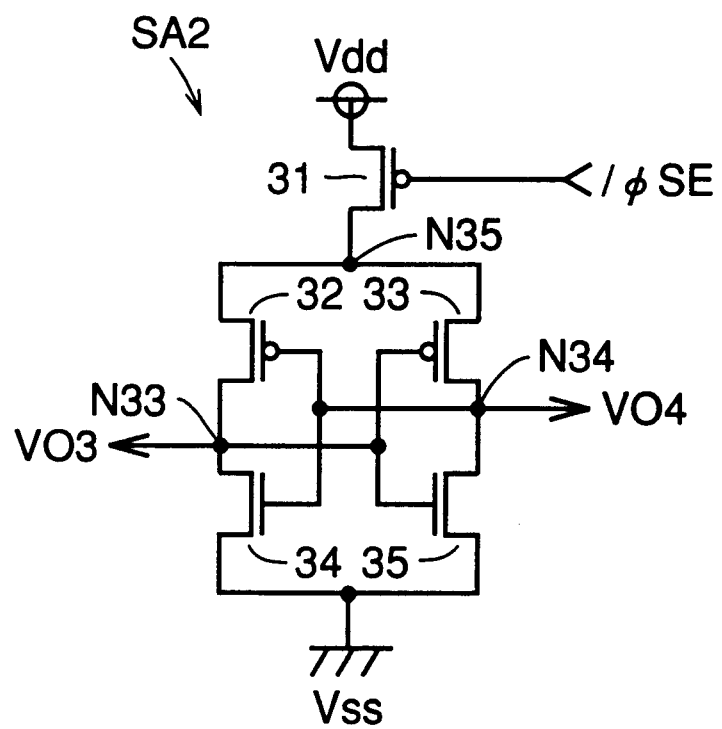

Sense amplifier SA2 includes P-channel MOS transistors 31 to 33 and N-channel MOS transistors 34 and 35 as shown in FIG. 2B. P-channel MOS transistor 31 is connected between the line to power supply potential Vdd and node N31 and receives a sense amplifier activation signal /φSE (the inverse of signal φSE) at its gate. P-channel MOS transistors 32 and 33 are connected between node N35 and input/output nodes N33 and N34, respectively, and have their gates connected to input/output nodes N34 and N33, respectively. N-channel MOS transistors 34 and 35 are connected between input/output nodes N33 and N34 and the line to ground potential Vss and have their gates connected to input/output nodes N34 and N33, respectively. The potentials of input/output nodes N33 and N34 become the output signals VO3 and VO4 of sense amplifier SA2, respectively.

Sense amplifier SA2 is activated in response to sense activation signal /φSE attaining an "L" level and pulls the node on the higher potential between input/output nodes N33 and N34, and the node on the lower potential to ground potential Vss. Thus, the potential difference between input/output nodes N33 and N34 is amplified to power supply voltage Vdd.

Figure 3:
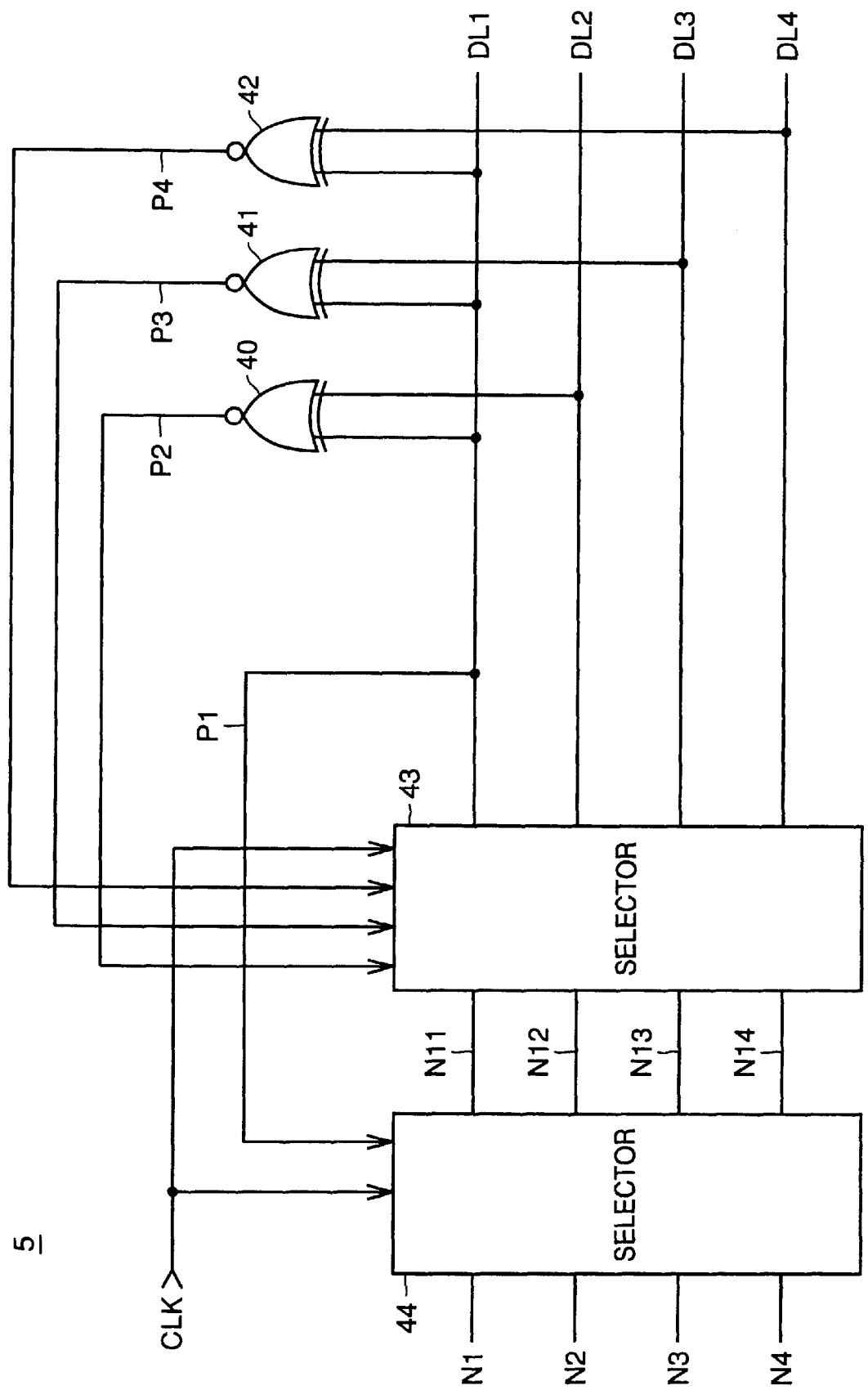
FIG. 3 is a circuit block diagram of selector 5 shown in FIG. 1.

Selector 5 includes Ex-NOR gates 40 to 42 and selectors 43 and 44 as shown in FIG. 3. Ex-NOR gate 40 compares the potentials of data lines DL1 and DL2, and outputs a signal P2 based on the result of comparison. Signal P2 attains an "H" level when data lines DL1 and DL2 are at the same potential, and otherwise attains an "L" level. Ex-NOR gate 41 compares the potentials of data lines DL1 and DL3 and outputs a signal P3 based on the result of the comparison. Signal P3 attains an "H" level when data lines DL1 and DL3 are at the same potential, and otherwise attains an "L" level. Ex-NOR gate 42 compares the potentials of data lines DL1 and DL4 and outputs a signal P4 based on the result of comparison. Signal P4 attains an "H" level when data lines DL1 and DL4 are at the same potential, and otherwise attains an "L" level.

A selector 43 operates in synchronization with a clock signal CLK, and pairs each two data lines at the same potential of four data lines DL1 to DL4 based on the output signals P2 to P4 of Ex-NOR gates 40 to 42 in an equalizing period, and connects one end of one data line pair to nodes N11 and N12, and the other end of data line pair to nodes N13 and N14. A selector 44 operates in synchronization with clock signal CLK and connects the node pair at power supply potential Vdd between node pairs N11, N12 and N13, N14 to the output nodes N1 and N2 of drivers 1 and 2 and the node pair at ground potential Vss to the output nodes N3 and N4 of drivers 3 and 4, based on signal P1 at the potential of data line DL1 during an equalizing period.

Figure 4:
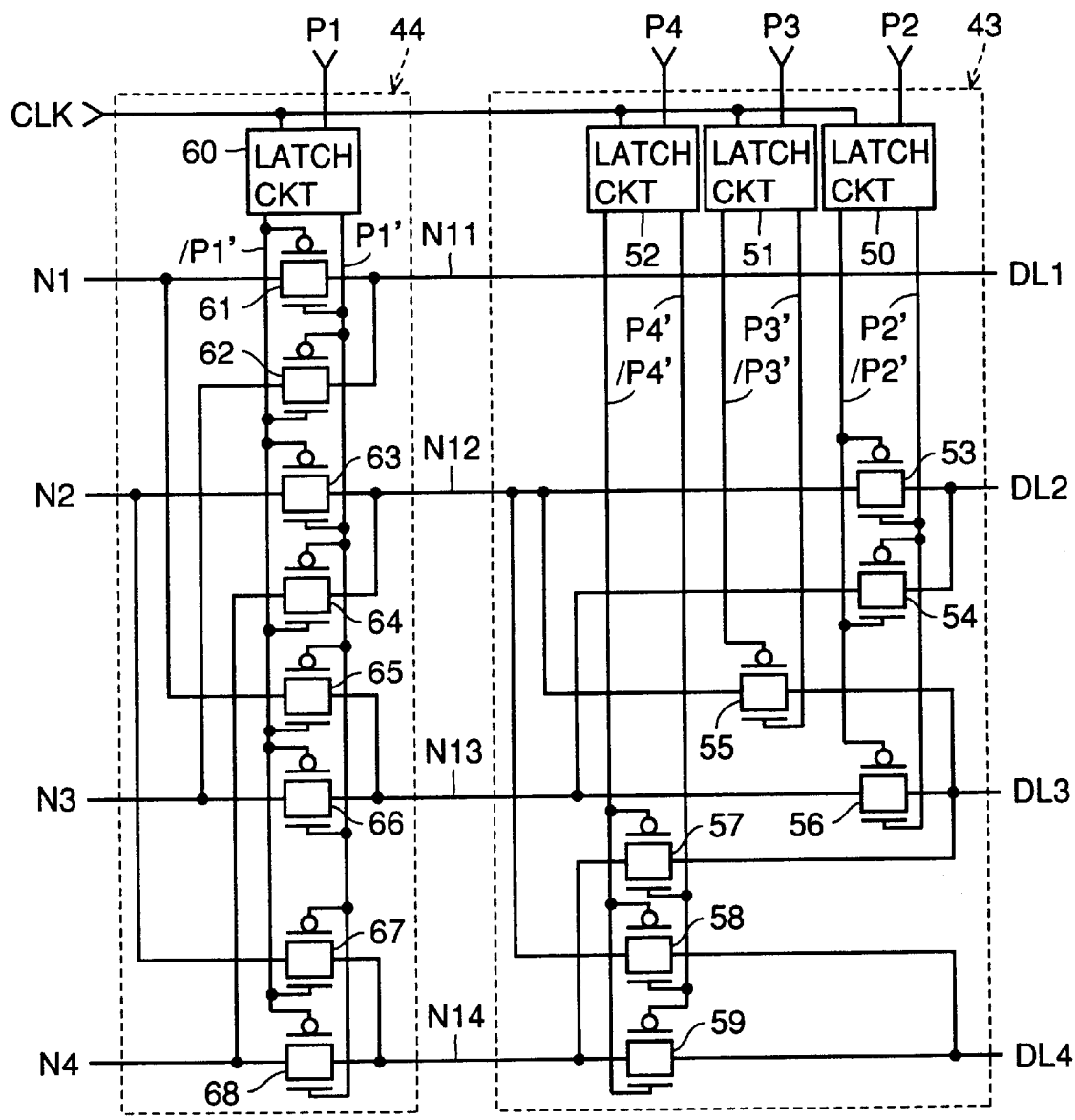
FIG. 4 is a circuit block diagram of selectors 43 and 44 shown in FIG. 3.
Figure 5:
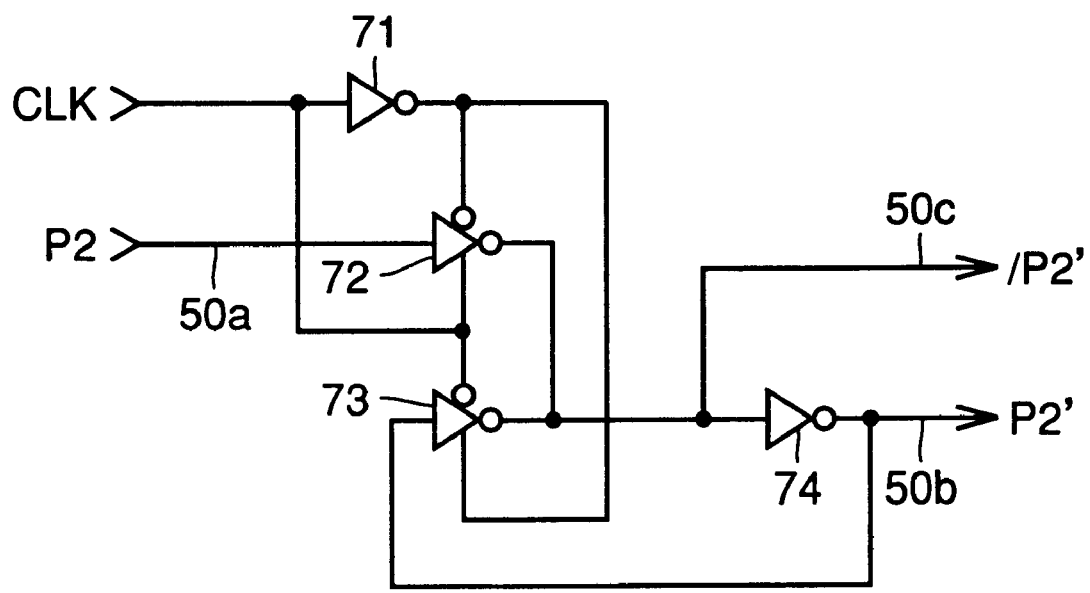
FIG. 5 is a circuit diagram of latch circuit 50 shown in FIG. 4.

FIG. 4 is a circuit block diagram of selectors 43 and 44. Referring to FIG. 4, selector 43 includes latch circuits 50 to 52 and transfer gates 53 to 59. Latch circuit 50 includes inverters 71 and 74 and clocked inverters 72 and 73 as shown in FIG. 5. Clocked inverter 72 and inverter 74 are connected in series between an input node 50a and an output node 50b. The node between clocked inverter 72 and inverter 74 is an inverted output node 50c. Clocked inverter 73 is connected in antiparallel to inverter 74. Clock signal CLK is directly input to the power supply node of clocked inverter 72 and the ground node of clocked inverter 73. Clock signal CLK is input to the ground node of clocked inverter 72 and the power supply node of clocked inverter 73 through inverter 71. Clock signal CLK is a signal which attains an "H" level during an equalizing period and an "L" level during a data transfer period.

During an equalizing period, clock signal CLK attains an "H" level to activate clocked inverter 72 and inactivate clocked inverter 73, and the output signal P2 of Ex-NOR gate 40 is directly transmitted to output node 50b while the inverse of signal P2 is output to inverted output node 50.

During a data transfer period, clock signal CLK attains an "L" level to inactivate clocked inverter 72 and activate clocked inverter 73, while an output signal in an immediately previous equalizing period is latched by clocked inverter 73 and inverter 74 for output. Latch circuits 51 and 52 have the same configuration as latch circuit 50 except that signals P3 and P4 are input instead of signal P2.

Data line DL1 is directly connected to node N11. Data line DL2 is connected to node N12 through transfer gate 53 and to node N13 through transfer gate 54. Data line DL3 is connected to node N12 through transfer gate 55, to node N13 through transfer gate 56 and to node N14 though transfer gate 57. Data line DL4 is connected to node N12 through transfer gate 58 and to node N14 through transfer gate 59.

If the potentials of data lines DL1 and DL2 are the same and signal P2 attains an "H" level while signals P3 and P4 attain an "L" level, only transfer gates 53,56 and 59 conduct among transfer gates 53 to 59, and data lines DL1 and DL4 are connected to nodes N11 to N14, respectively. If the potentials of data lines DL1 and DL3 are the same and signal P3 attains an "H" level while signals P4 and P2 attain an "L" level, only transfer gates 54, 55 and 59 conduct, and data lines DL1 to DL4 are connected to N11, N13, N12 and N14, respectively.

If the potentials of data line DL1 and DL4 are the same and signal P4 attains an "H" level while signals P2 and P3 attain an "L" level, only transfer gates 54, 57 and 58 conduct, and data lines DL1 to DL4 are connected to N11, N13, N14 and N12, respectively.

Selector 44 includes a latch circuit 60 and transfer gates 61 to 68. Latch circuit 60 has the same configuration as latch circuit 50 in FIG. 5 except that signal P1 is input instead of signal P2. Node N11 is connected to node N1 through transfer gate 61 and to node N13 through transfer gate 62. Node N12 is connected to node N2 through transfer gate 63 and to node N4 through transfer gate 64. Node N13 is connected to node N1 through transfer gate 65 and to node N3 through transfer gate 66. Node N14 is connected to node N4 through transfer gate 68.

If the potential of data line DL1, in other words, signal P1 is at an "H" level, only transfer gates 61, 63, 66 and 68 conduct among transfer gates 61 to 68, and nodes N11 to N14 are connected to nodes N1 to N4, respectively.

If the potential of data line DL1, in other words, signal P1 is at an "L" level, only transfer gates 62, 64, 65 and 67 conduct among transfer gates 61 to 68 conduct, and nodes N11 to N14 are connected to nodes N3, N4, N1, and N2, respectively.

Figure 6:
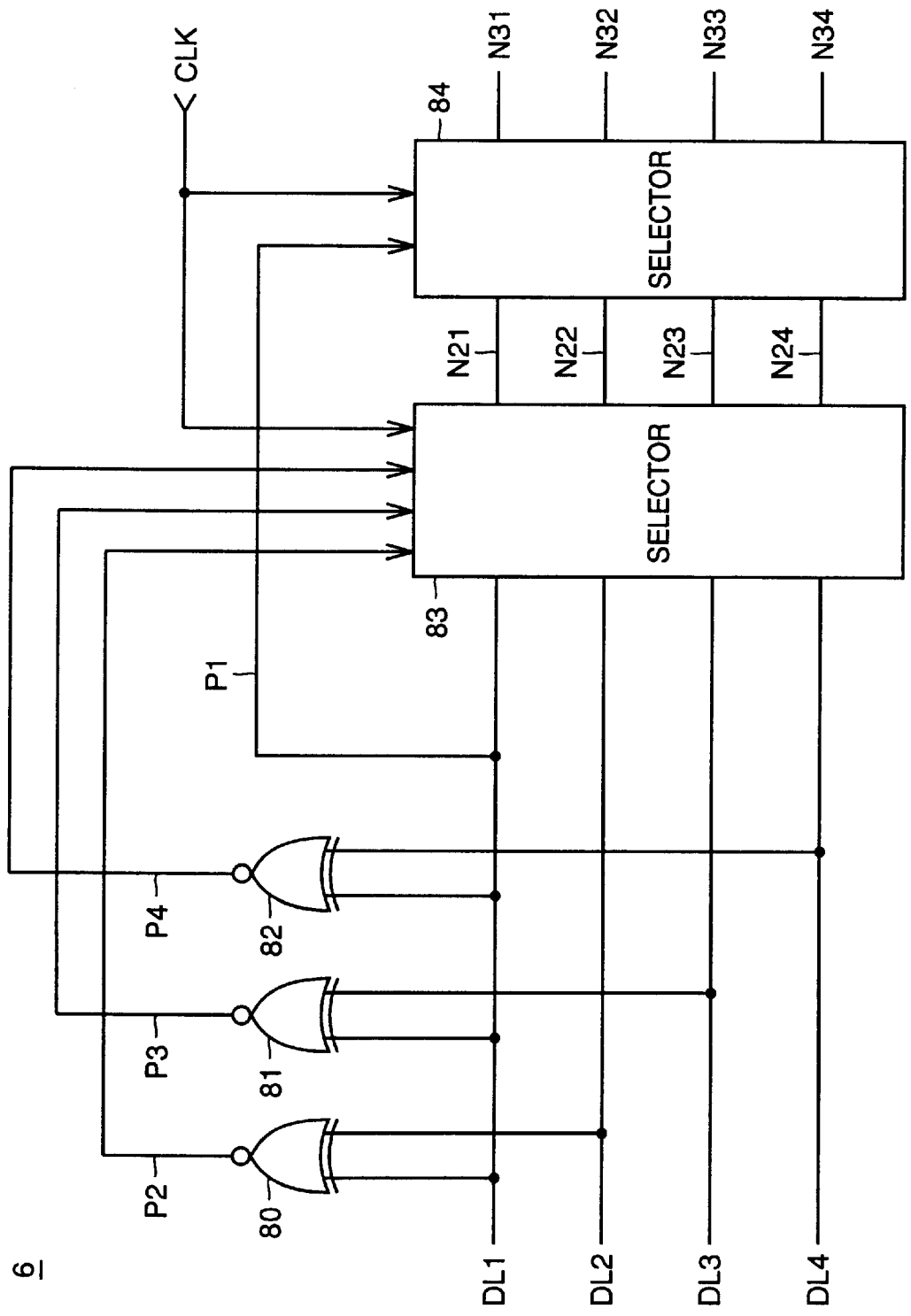
FIG. 6 is a circuit block diagram of selector 6 shown in FIG. 1.

Selector 6 includes Ex-NOR gates 80 to 82 and selectors 83 and 84 as shown in FIG. 6. Ex-NOR gate 80 compares the potentials of data lines DL1 and DL2 and outputs signal P2 based on the result of comparison. Signal P2 attains an "H" level if the potentials of data lines DL1 and DL2 are the same and otherwise attains an "L" level. Ex-NOR gate 81 compares the potentials of data lines DL1 and DL3 and outputs signal P3 based on the result of comparison. Signal P3 attains an "H" level if the potentials of data lines DL1 and DL3 are the same and otherwise attains an "L" level. Ex-NOR gate 82 compares the potentials of data lines DL1 and DL4 and outputs signal P4 based on the result of comparison. Signal P4 attains an "H" level if the potentials of data lines DL1 and DL4 are the same and otherwise attains an "L" level.

Selector 83 operates in synchronization with clock signal CLK and pairs each two data lines at the same potential among four data lines DL1 to DL4 based on the output signals P2 to P4 of Ex-NOR gates 80 to 82, and connects one end of one data line pair to nodes N21 and N22 and one end of the other data line pair to nodes N23 and N24.

Selector 84 operates in synchronization with clock signal CLK and connects a node pair at power supply potential Vdd among node pairs N21, N22 and N23, N24 to the input/output nodes N31 and N32 of sense amplifier SA1 and connects a node pair at ground potential Vss to the input/output nodes N33 and N34 of sense amplifier SA2.

Figure 7:
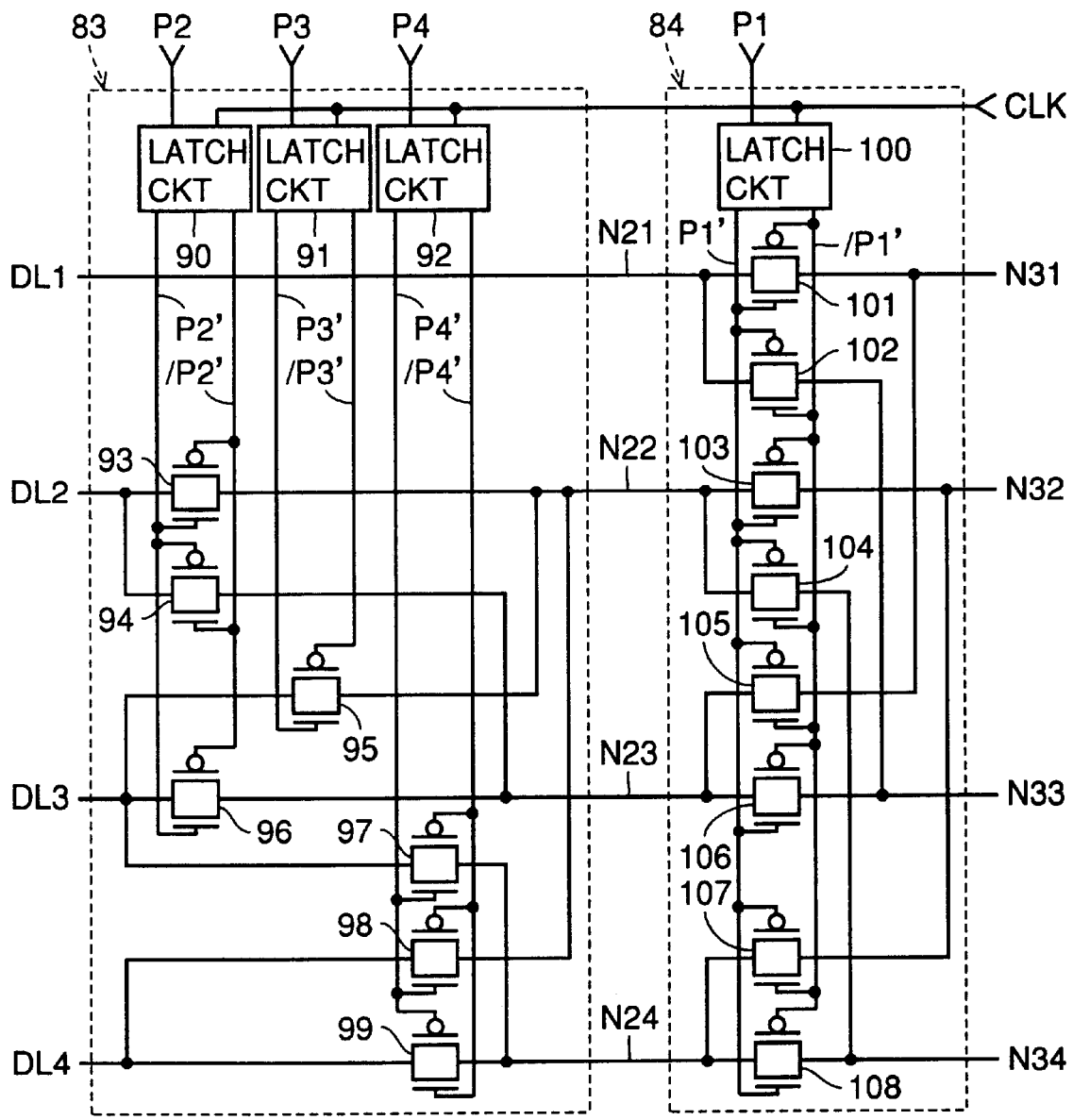
FIG. 7 is a circuit block diagram of selectors 83 and 84 shown in FIG. 6.
Figure 8:
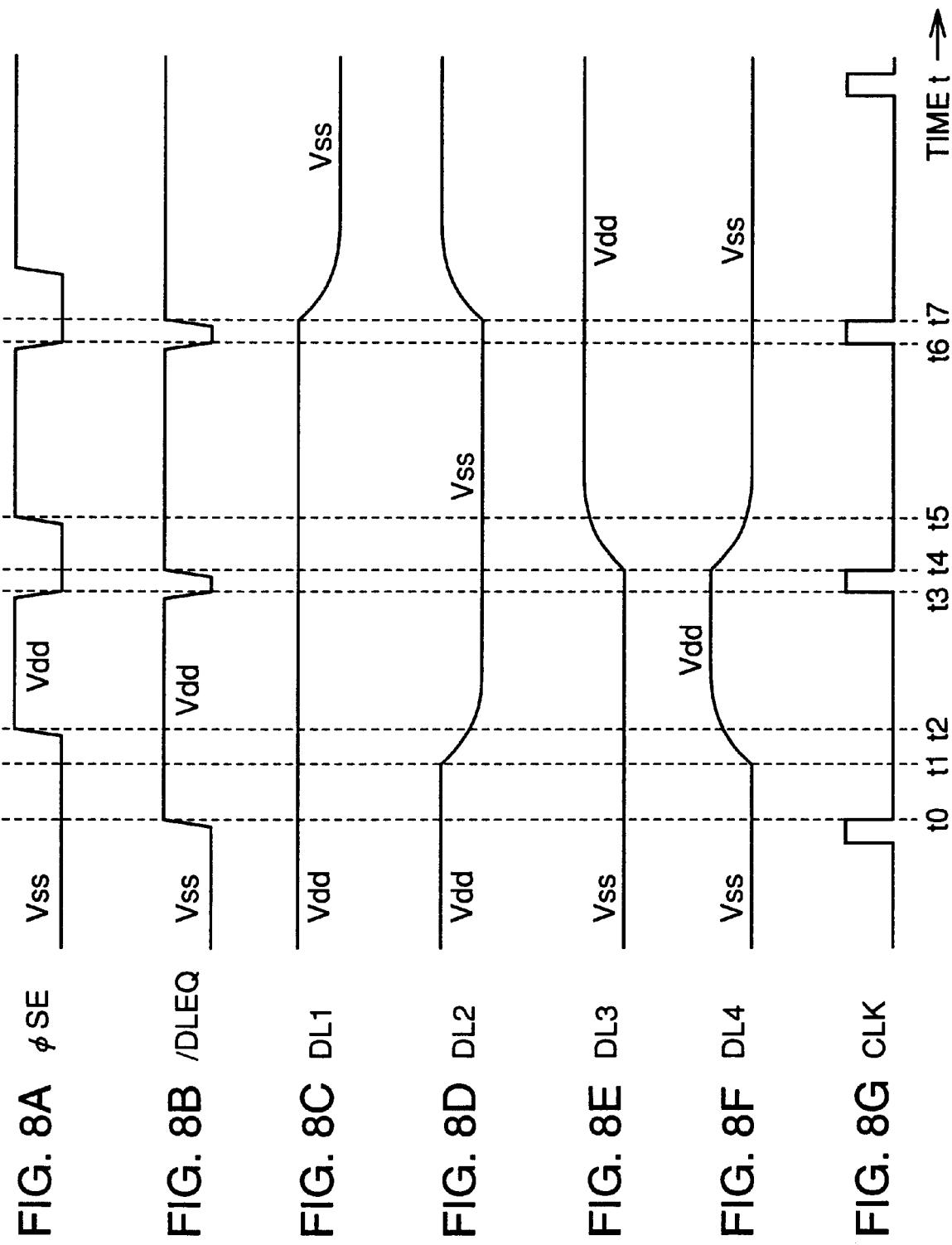
FIGS. 8A to 8G are timing charts for use in illustration of the operation of the data transfer circuit shown in FIGS. 1 to 7.

FIG. 7 is a circuit block diagram of selectors 83 and 84. Referring to FIG. 7, selector 83 includes latch circuits 90 to 92 and transfer gates 93 to 99. Latch circuits 90 to 92 have the same configuration as latch circuits 50 to 52 shown in FIG. 4. Data line DL1 is directly connected to node N21. Data line DL2 is connected to node N22 through transfer gate 93 and to node N23 through transfer gate 94. Data line DL3 is connected to node N22 through transfer gate 95, to node N23 through transfer gate 96 and to node N24 through transfer gate 97. Data line DL4 is connected to node N22 through transfer gate 98 and to node N24 through transfer gate 99.

If the potentials of data lines DL1 and DL2 are the same and signal P2 attains an "H" level while signals P3 and P4 attain an "L" level, only transfer gates 93, 96 and 99 conduct among transfer gates 93 to 99 and data lines DL1 to DL4 are connected to nodes N21 to N24, respectively.

If the potentials of data line DL1 and DL3 are the same and signal P3 attains an "H" level while signals P4 and P2 attain an "L" level, only transfer gates 94, 95 and 99 conduct among transfer gates 93 to 99 and data lines DL1 to DL4 are connected to nodes N21, N23, N22 and N24, respectively.

If the potentials of data lines DL1 and DL4 are the same and signal P4 attains an "H" level while signals P2 and P3 attain an "L" level, only transfer gates 94, 97 and 98 conduct among transfer gates 93 to 99 and data lines DL1 to DL4 are connected to nodes N21, N23, N24 and N22, respectively.

Selector 84 includes a latch circuit 100 and transfer gates 101 to 108. Latch circuit 100 has the same configuration as latch circuit 50 in FIG. 5 except signal P1 is input instead of signal P2. Node N21 is connected to node N31 through transfer gate 101 and to node N33 through transfer gate 102. Node N22 is connected to node N32 through transfer gate 103 and to node N34 through transfer gate 104. Node N23 is connected to node N31 through transfer gate 105 and to node N33 through transfer gate 106. Node N24 is connected to node N32 through transfer gate 107 and to node N34 through transfer gate 108.

If the potential of data line DL1, in other words, signal P1 is at an "H" level, only transfer gates 101, 103, 106 and 108 conduct among transfer gates 101 to 108, and nodes N21 to N24 are connected to nodes N31 to N34, respectively.

If the potential of data line DL1, in other words, signal P1 is at an "L" level, only transfer gates 102, 104, 105 and 107 conduct among transfer gates 101 to 108, and nodes N21 to N24 are connected to nodes N33, N31, and N32, respectively.

FIGS. 8A to 8G are timing charts for use in illustration of the operation of the data transfer circuit shown in FIGS. 1 to 7. Referring to FIGS. 8A to 8G, in an initial state, data lines DL1 to DL4 are connected to nodes N1 to N4, respectively by selector 5 and to nodes N31 to N34, respectively by selector 6. Sense amplifier activation signal φSe attains an "L" level to inactivate sense amplifier SA1, and data line equalize signal /DLEQ attains an "L" level to activate equalizers EQ1 and EQ2. As a result, data lines DL1 and DL2 both attain power supply potential Vdd and data lines DL3 and DL4 are both at ground potential Vss.

At time t0, data line equalize signal /DLEQ attains an "H" level to inactivate equalizers EQ1 and EQ2, and at time t1, data starts to be transmitted. Herein, internal signal S2 falls from an "H" level to an "L" level while output node N2 falls from an "H" level to an "L" level, and internal signal S4 rises from an "L" level to an "H" level while the output node N4 of driver 4 rises from an "L" level to an "H" level.

Therefore, the potentials of data line DL2 and node N32 connected to node N2 through selectors 5 and 6 fall, and the potentials of data line DL4 and node N34 connected to node N4 through selectors 5 and 6 rise. The potentials of data line DL1 and node N31 connected to node N1 are unchanged and remain at Vdd, and the potentials of data line DL3 and node N33 connected to node N3 are unchanged and remain at Vss.

At time t2 when the potential difference between nodes N31 and N32 and the potential difference between nodes N33 and N34 become detectable by sense amplifiers SA1 and SA2, sense amplifier activation signal φSE attains an "H" level to activate sense amplifiers SA1 and SA2, so that the potential differences between nodes N31 and N32 and nodes N34 and N33 are amplified to power supply voltage Vdd. At time t3 when clock signal CLK rises to an "H" level, sense amplifier activation signal φSE attains an "L" level to inactivate sense amplifiers SA1 and SA2, and the first data transfer completes.

At the end of the data transfer, data lines DL1 and DL4 are at power supply potential Vdd and data lines DL2 and DL3 are at ground potential Vss. Selector 5 connects data lines DL1 and DL4 at power supply potential Vdd to nodes N1 and N2, respectively and connects data lines DL2 and DL3 at ground potential Vss to nodes N3 and N4, respectively. Selector 6 connects data lines DL1 and DL4 at power supply Vdd to nodes N31 and N32, respectively and connects data lines DL2 and DL3 at ground potential Vss to nodes N33 and N34, respectively. Data line equalize signal /DLEQ attains an "L" level to activate equalizers EQ1 and EQ2.

At this time, data lines DL1 to DL4 have already attained precharge potential Vdd or Vss, and therefore only nodes N2, N4, N32 and N34 should be precharged, so that the time required for equalizing and the power consumption are significantly reduced compared to the conventional case.

At time t4, clock signal CLK attains an "L" level and data transfer for the second time is started. Similarly to the first time, internal signal S2 falls from an "H" level to an "L" level, and the output node N2 of driver 2 falls from an "H" level to an "L" level while signal S4 rises from an "L" level to an "H" level and the output node N4 of driver 4 rises from an "L" level to an "H" level.

At this time, data line DL4 and node N32 connected to node N2 through selectors 5 and 6 fall while data line DL3 and node N33 connected to node N4 through selectors 5 and 6 rise. The potentials of data line DL1 and node N31 connected to node N1 remain unchanged at Vdd, and the potential of data line DL2 connected to node N3 also remains unchanged at Vss.

At time t5 when the potential difference between nodes N31 and N32 and the potential difference between nodes N33 and N34 become detectable by sense amplifiers SA1 and SA2, sense amplifier activation signal φSE attains an "H" level to activate sense amplifiers SA1 and SA2, and the potential differences between nodes N31 and N32 and nodes N34 and N33 are amplified to power supply voltage Vdd. At time t6, clock signal CLK rises to an "H" level, sense amplifier activation signal φSE attains an "L" level to inactivate sense amplifiers SA1 and SA2, and the second data transfer is completed.

At the end of the data transfer, data lines DL1 and DL3 are at power supply potential Vdd and data lines DL2 and DL4 are at ground potential Vss. Selector 5 connects data lines DL1 and DL3 at power supply potential Vdd to nodes N1 and N2, respectively, and connects data lines DL2 and DL4 at ground potential Vss to nodes N3 and N4, respectively. Selector 6 connects data lines DL1 and DL3 at power supply potential Vdd to nodes N31 and N32, respectively, and data lines DL2 and DL4 at ground potential Vss to nodes N33 and N34, respectively. Data line equalize signal /DLEQ attains an "L" level to activate equalizers EQ1 and EQ2.

At this time, since data lines DL1 to DL4 have already been pulled to precharge potential Vdd or Vss, only nodes N2, N4, N32 and N34 must be precharged, so that the time required for equalizing and the power consumption are significantly reduced compared to the conventional case.

At time t7, clock signal CLK attains an "L" level, data transfer for the third time is started, and the same process applies to the third data transfer and on.

In this embodiment, data lines are precharged to power supply potential Vdd or ground potential Vss and then driven to ground potential Vss or power supply potential Vdd, but the invention is not limited to this, and all the methods which switch the connection between a data line and a differential amplifier such that the difference between the potential of the data line and a precharge potential is small at the end of data transfer are all included in the scope of the invention, Also in this embodiment, sense amplifiers SA1 and SA2 having an amplification function are provided on the receiving side, but comparators without the amplification function may be provided in place of the sense amplifiers.

Figure 9:
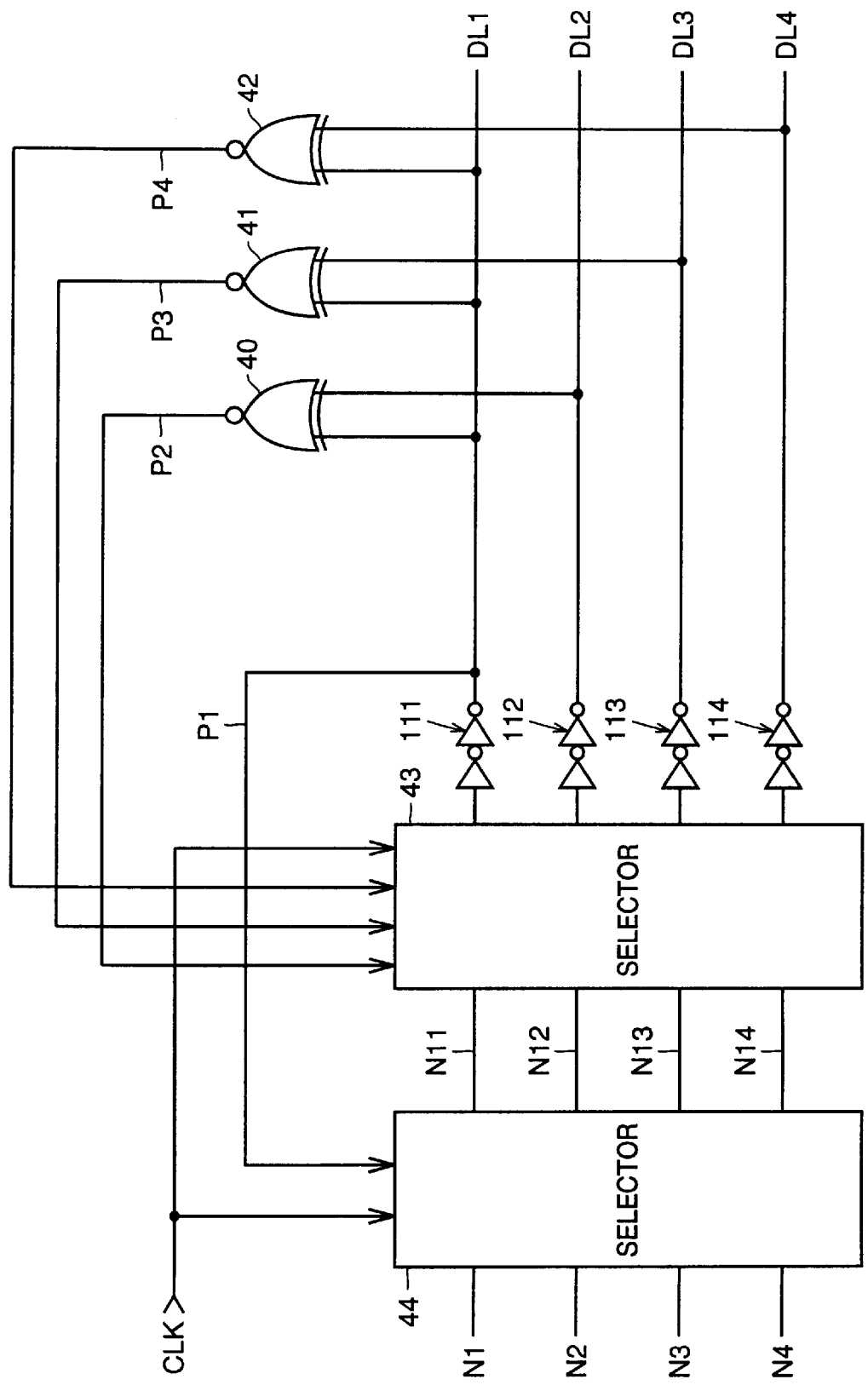
FIG. 9 is a circuit block diagram of a modification of the data transfer circuit shown in FIG. 1.

If transfer gates 53 to 59 and 61 to 68 included in selector 5 on the data transmitting side increase the load of drivers 1 to 4, and the capability of the drivers is not enough, buffers 11 to 14 may be provided between selector 43 and data lines DL1 to DL4, respectively as shown in FIG. 9. In this case, since drivers 1 to 4 do not have to drive data lines DL1 to DL4, the capability of drivers 1 to 4 may be small.

Figure 10:
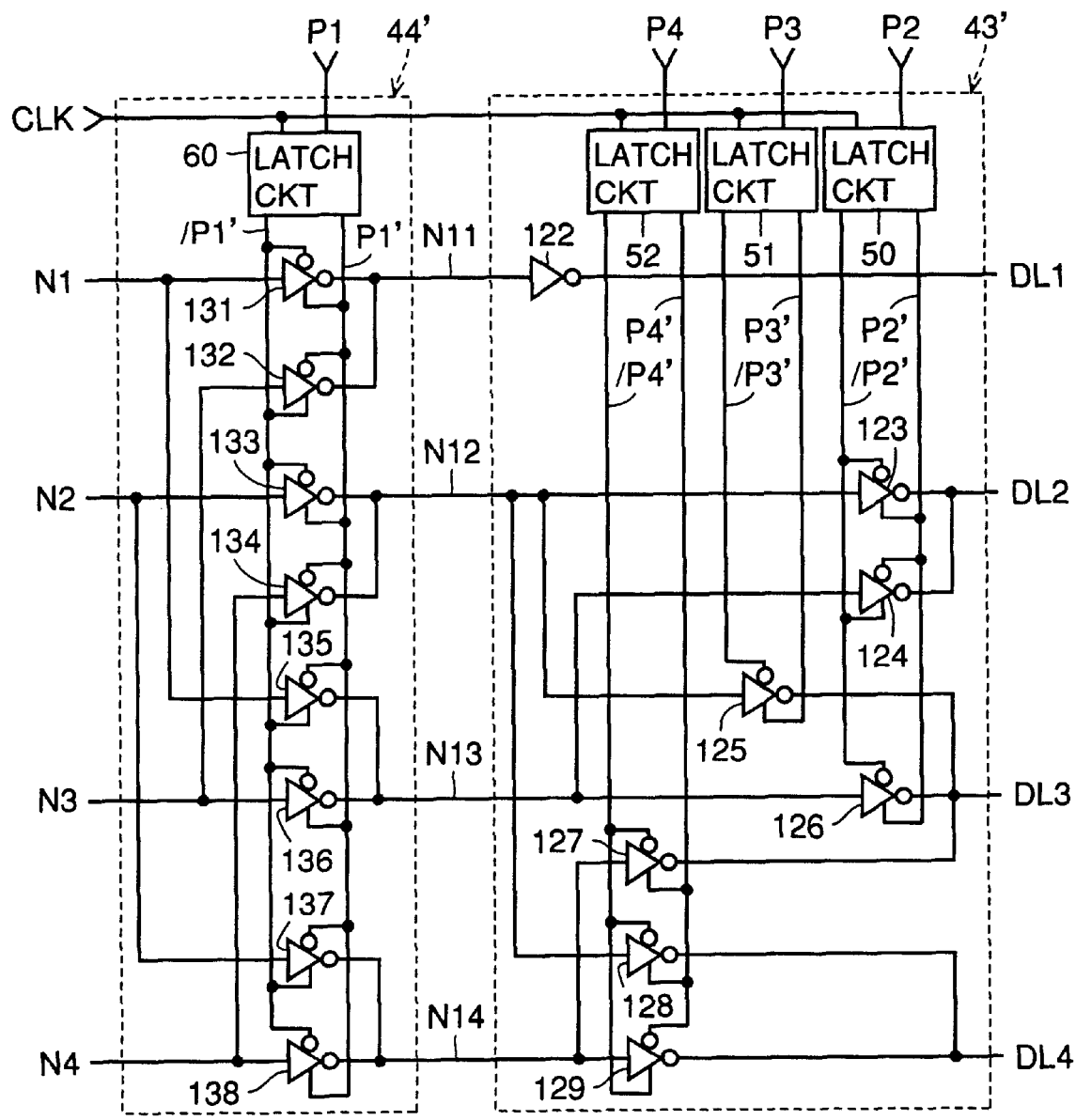
FIG. 10 is a circuit block diagram of another modification of the data transfer circuit shown in FIG. 1.

As shown in FIG. 10, the transfer gates 53 to 59 and 61 to 68 of selectors 43 and 44 may be replaced. with clocked inverters 123 to 129 and 131 to 138. Note however that two stages of inverters are provided between nodes N1 to N4 and data lines DL1 to DL4, and therefore an inverter 122 must be provided between node N11 and data line DL1. In this case, the driving capability is increased to improve the data transfer speed.

Second Embodiment

Figure 11:
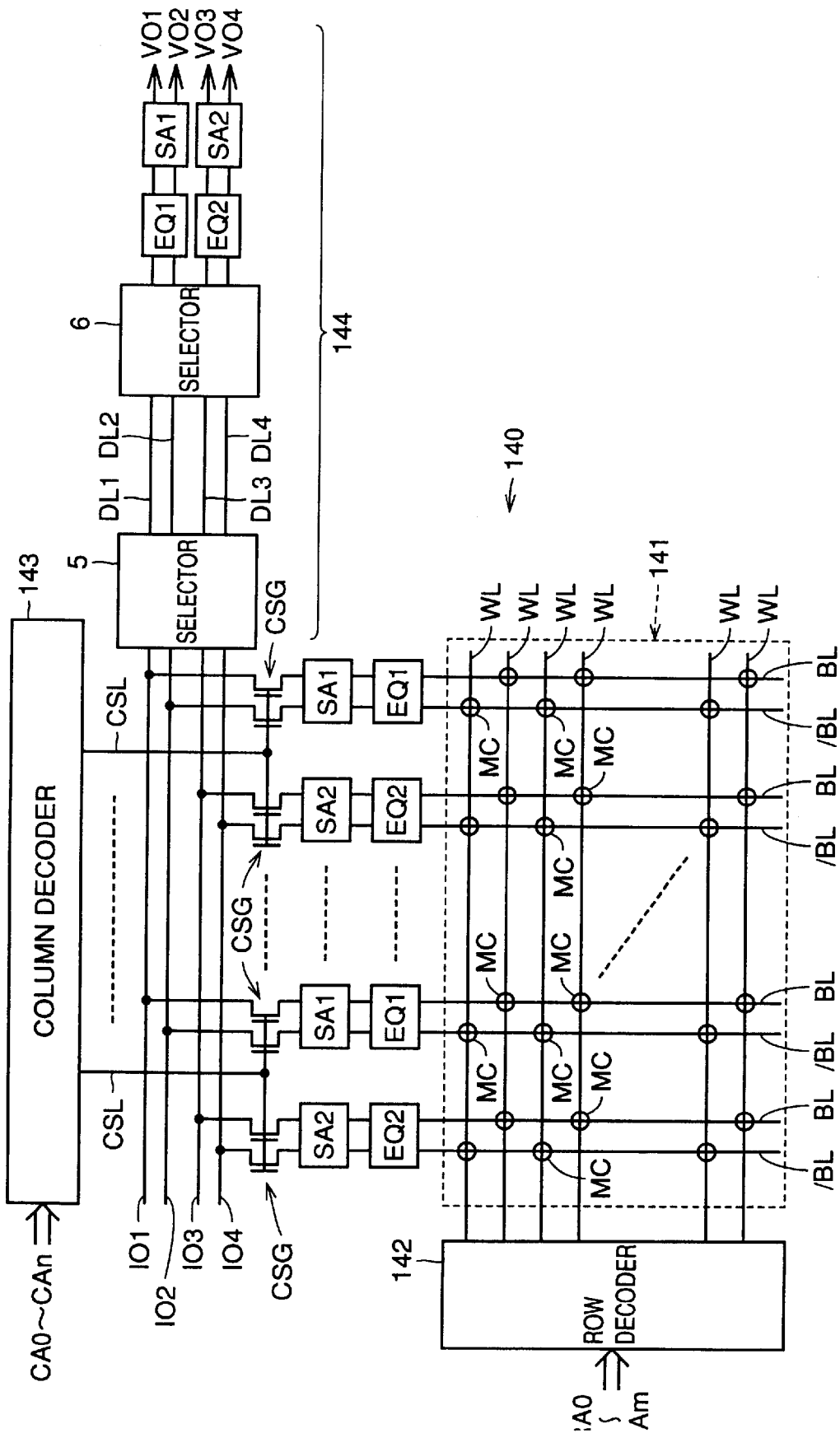
FIG. 11 is a partly omitted circuit block diagram of a semiconductor integrated circuit device according to a second embodiment of the present invention.

FIG. 11 is a partly omitted circuit block diagram of a semiconductor integrated circuit device according to a second embodiment of the present invention. Referring to FIG. 11, the semiconductor integrated circuit device includes a DRAM 140 and a data transfer circuit 144 to transfer the output data of DRAM 140 to other circuit blocks (not shown).

DRAM 140 includes a memory array 141, a row decoder 142, a column decoder 143, equalizers EQ1 and EQ2, sense amplifiers SA1 and SA2, column selecting gate CSG and data input/output line pairs IO1, IO2 and IO3, IO4.

Memory array 141 includes a plurality of memory cells MC arranged in a matrix of rows and columns, a word line WL provided corresponding to each row, a bit line pairs BL, /BL provided corresponding to each column. Memory cell MC is a well known type including an N-channel MOS transistor for accessing and a capacitor for storing information.

One end of each word line WL is connected to row decoder 142. Row decoder 142 pulls one of a plurality of word lines WL to a selected, "H" level in response to row address signals RA0 to RAm (m: integer not less than 0), and activates a memory cell MC in a row corresponding to the word line WL.

Bit line pairs BL, /BL are previously grouped in twos, and one of two bit line pairs BL, /BL in each group is provided with equalizer EQ1 and sense amplifier SA1, and the other is provided with equalizer EQ2 and sense amplifier SA2. Equalizers EQ1 and EQ2 and sense amplifiers SA1 and SA2 are the same as those according to the first embodiment described in conjunction with FIGS. 1 and 2.

Bit line pair BL, /Bl provided with equalizer EQ1 and sense amplifier SA1 is connected to data input/output line pair IO1, IO2 through a column selecting gate CSG. Bit line pair BL, /BL provided with equalizer EQ2 and sense amplifier SA2 is connected to data input/output line pair IO3, IO4 through a column selecting gate CSG.

One column selecting line CSL is provided for each bit line pair group. One end of column selecting line CSL is connected to the gates of N-channel MOS transistors included in a column selecting gate CSG corresponding to a group, and the other end is connected to a column decoder 143.

Column decoder 143 pulls one of the plurality of column selecting lines CSL to a selected, "H" level in response to column address signals CA0 to CAn (n: integer not less than 0) and turns on a column selecting gate CSG corresponding that column selecting line CSL.

Data transfer circuit 144 includes selectors 5 and 6, data lines DL1 to DL4, equalizers EQ1 and EQ2 and sense amplifiers SA1 and SA2. The construction and operation of these elements are the same as those described in the first embodiment. The data input/output lines IO1 to IO4 of DRAM 140 are connected to selector 5 in place of the output nodes N1 to N4 of drivers 1 to 4 shown in FIG. 1.

The operation of the semiconductor integrated circuit device will be now briefly described. Each memory cell MC is previously written with data. After each bit line pair BL, /BL is equalized by equalizers EQ1 and EQ2, row decoder 142 raises a word line WL in a row corresponding to row address signals RA0 to RAM to a selected, "H" level. The potentials of bit lines BL and /BL change for a small amount based on the data of the activated memory cell MC. Subsequently, sense amplifiers SA1 and SA2 are activated and one of bit lines BL and /BL which has a higher potential is pulled to power supply potential Vdd, and the other bit line is pulled to ground potential Vss.

Then, column decoder 143 raises a column selecting line CSL for a group corresponding to column address signals CA0 to CAi to a selected, "H" level, and turns on the two column selecting gates CSG of the group. The data of bit line pair BL, /BL in the selected group is provided to data transfer circuit 144 through column selecting gate CSG and data input/output line pairs IO1, IO2 and IO3, IO4. The operation of data transfer circuit 144 is the same as that described in the first embodiment.

Therefore, the data of DRAM 140 can be transferred to other circuits at a high speed and with reduced power consumption according to this embodiment.

Third Embodiment

In the first and second embodiments, selector 6 on the data receiving circuit side must pass an analog signal and is formed by the plurality of transfer gates 93 to 99 and 101 to 108. If the number of stages of transfer gates 93 to 99 and 101 to 108 increases, or input signals to circuits 80 to 82 for determination are provided from data lines DL1 to DL4, the load of data lines DL1 to DL4 increases, which delays the transmission of signals, and the capacitance or resistance will be different among the data lines. Therefore, in this embodiment, in order to solve this disadvantage, the minimum number of, in other words, only one stage of transfer gates is provided on each data line, the connection states of data lines DL1 to DL4 and drivers 1 to 4 and sense amplifiers SA1 and SA2 are stored, and the connection of data lines DL1 to DL4 is switched in the next data transfer based on the stored connection states and transferred data.

Figure 12:
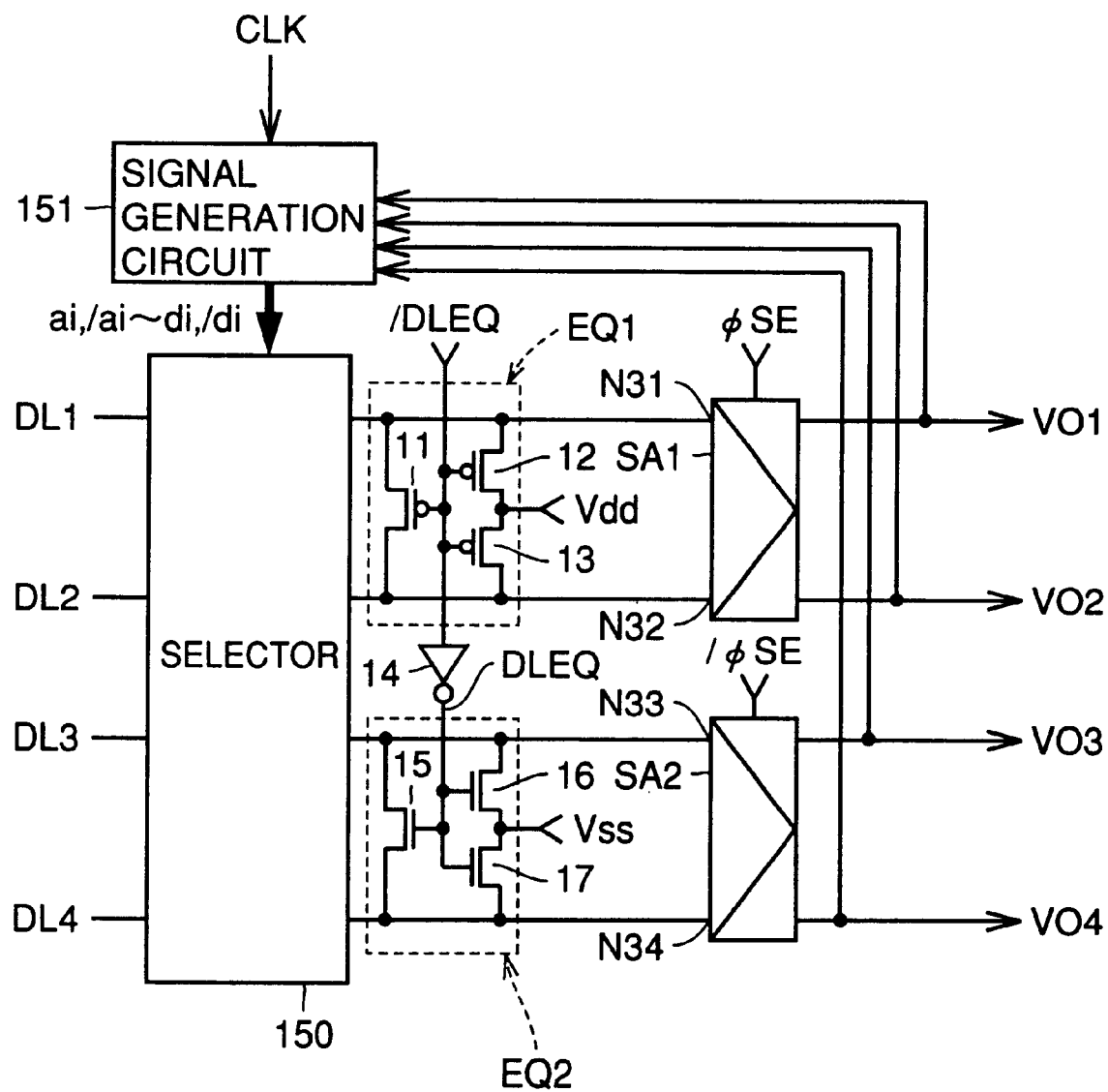
FIG. 12 is a circuit block diagram of a data transfer circuit in a semiconductor integrated circuit device according to a third embodiment of the present invention.
Figures 13A, 13B, 13C, 13D:
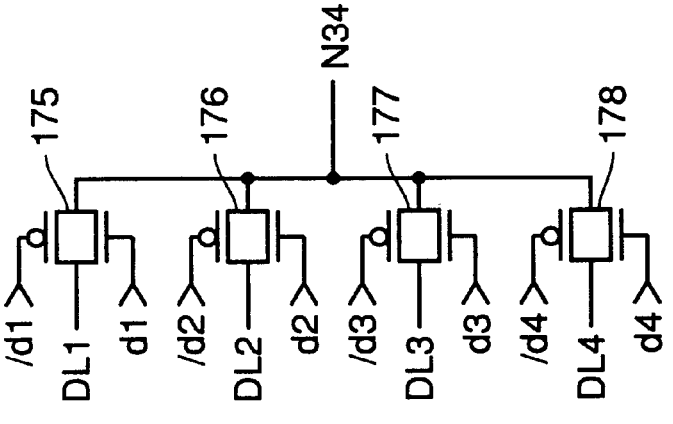
FIGS. 13A to 13D are circuit diagrams of selector 150 shown in FIG. 12.

FIG. 12 is a circuit block diagram of a main part of a data transfer circuit in a semiconductor integrated circuit device according to the third embodiment of the present invention. Referring to FIG. 12, this data transfer circuit is different from the data transfer circuit in FIG. 1 in that selector 6 is replaced with a selector 150 and a signal generating circuit 151 is additionally provided.

Selector 150 includes transfer gates 161 to 168 and 171 to 178 as shown in FIGS. 13A to 13D. Transfer gates 161 to 164 are connected between data lines DL1 to DL4 and node N31, respectively, and the gates on the N-channel MOS transistor side receive signals a1 to a4, and the gates on the P-channel MOS transistor side receive signals /a1 to /a4. Transfer gates 165 to 168 are connected between data lines DL1 to DL4 and node N32, respectively, and the gates on the N-channel MOS transistor side receive signals b1 to b4 and the gates on the P-channel MOS transistor side receive signals /b1 to /b4.

Transfer gates 171 to 174 are connected between data lines DL1 to DL4 and node N33, respectively, and the gates on the N-channel MOS transistor side receive signals c1 to c4 and the gates on the P-channel MOS transistor side receive signals /c1 to /c4. Transfer gates 171 to 178 are connected between data lines DL1 to DL4 and node N34, respectively, and the gates on the N-channel MOS transistor side receive signals d1 to d4 and the gates on the P-channel MOS transistor side receive signals /d1 to /d4.

Signal generating circuit 151 operates in synchronization with clock signals CLK and generates signals ai, /ai to di, /di (i=1, 2, 3, 4) based on the output signals VO1 to VO4 of sense amplifiers SA1 and SA2 and applies the generated signals to selector 150.

FIGS. 14 to 17 are diagrams of circuits to generate signals ai, /ai to di, /di. The circuit shown in FIG. 14A generates signals ai, /ai (i=1), and includes NAND gates 181 to 184, clocked inverters 185 to 188 and inverters 189 to 191. NAND gate 181 receives signals ai and VO1. NAND gate 182 receives signals bi and VO2. NAND gate 183 receives the output signals of NAND gates 181 and 182. Clocked inverter 186 and inverter 190 are connected in a ring form to constitute a latch circuit 192. The output signal of NAND gate 183 is input to inverter 190 through clocked inverter 185.

Clocked inverter 188 and NAND gate 184 are connected in a ring shape to form a latch circuit 193. The output signal of NAND gate 184 is signal ai and the output signal of clocked inverter 188 is signal /ai. The output signal of inverter 190 is input between clocked inverter 188 and one input node of NAND gate 184. A reset signal RES is input to the other input node of NAND gate 184 through inverter 191. When reset signal RES attains an "H" level is a pulse manner, signal ai (i=1) is reset to an "H" level.

Clock signal CLK is directly input to the power supply nodes of clocked inverters 186 and 187 and to the ground nodes of clocked inverters 185 and 188, and also input to the ground nodes of clocked inverters 186 and 187 and the power supply nodes of clocked inverters 185 and 188 through inverter 189. During a data transfer period in which clock signal CLK is at an "L" level, only clocked inverters 185 and 188 among clocked inverters 185 to 188 are activated, the output signal of NAND gate 183 is input to latch circuit 192 through clocked inverter 185 and latch circuit 193 latches signal ai.

During an equalizing period in which clock signal CLK is at an "H" level, only clocked inverters 186 and 187 are activated among clocked inverters 185 to 188, and the output signal of clocked inverter 185 is latched by latch circuit 192 and the output signal of inverter 190 is applied to latch circuit 193 through clocked inverter 187. Therefore, signal ai has the same logic as that of the output signal of NAND gate 183 during the data transfer period immediately before the equalizing period.

Figure 14A:
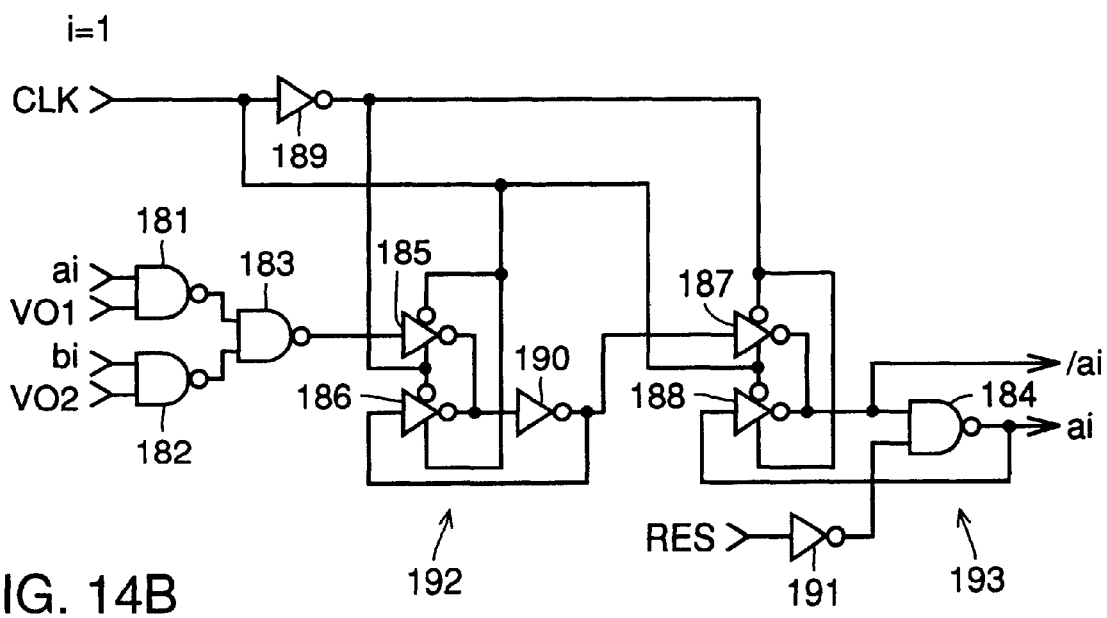
FIGS. 14A and 14B are circuit diagrams of circuits for generating signals ai and /ai shown in FIGS. 13A to 13D.
Figure 14B:
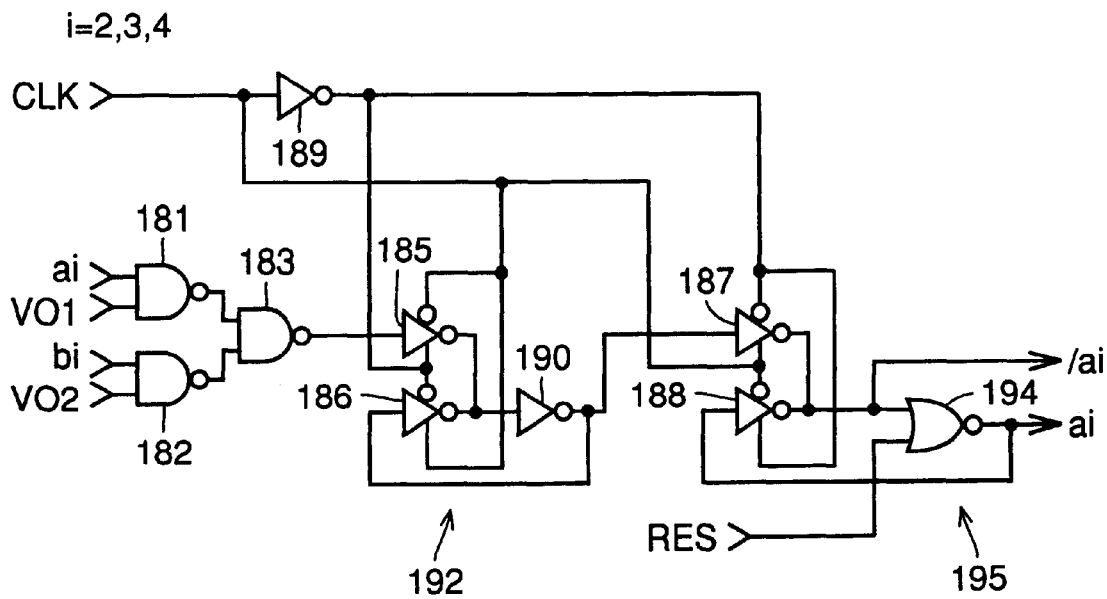

The circuit shown in FIG. 14B is a circuit to generate signals ai and /ai (i=2, 3, 4). This circuit is different from the circuit shown in FIG. 14A in that NAND gate 184 is replaced with an NOR gate 194 and inverter 191 is removed. Clocked inverter 188 and NOR gate 194 form a latch circuit 195. When reset signal RES attains an "H" level pulse-wise, signal ai (i=2, 3, 4) is reset to an "H" level.

Figure 15A:
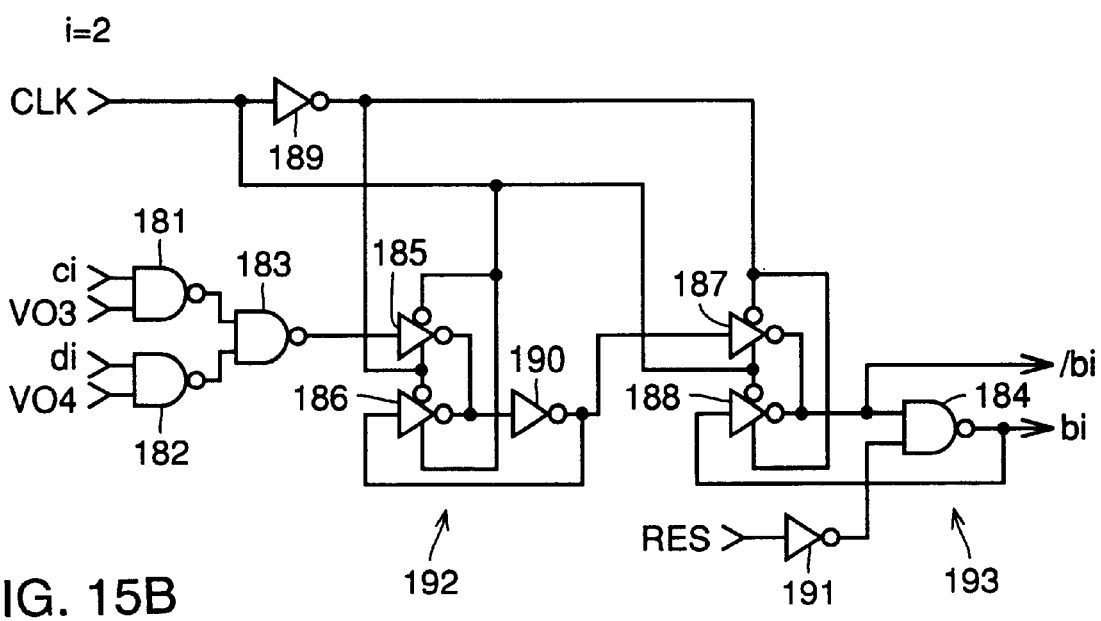
FIGS. 15A and 15B are circuit diagrams of circuits for generating signals bi and /bi shown in FIGS. 13A to 13D.

The circuit shown in FIG. 15A is a circuit to generate signals bi, /bi (i=2). NAND gate 181 receives signals ci and VO3, NAND gate 182 receives signals di and VO4, NAND gate 184 outputs signal bi, and clocked inverter 188 outputs signal /bi. The other construction is the same as that of the circuit in FIG. 14A.

Figure 15B:
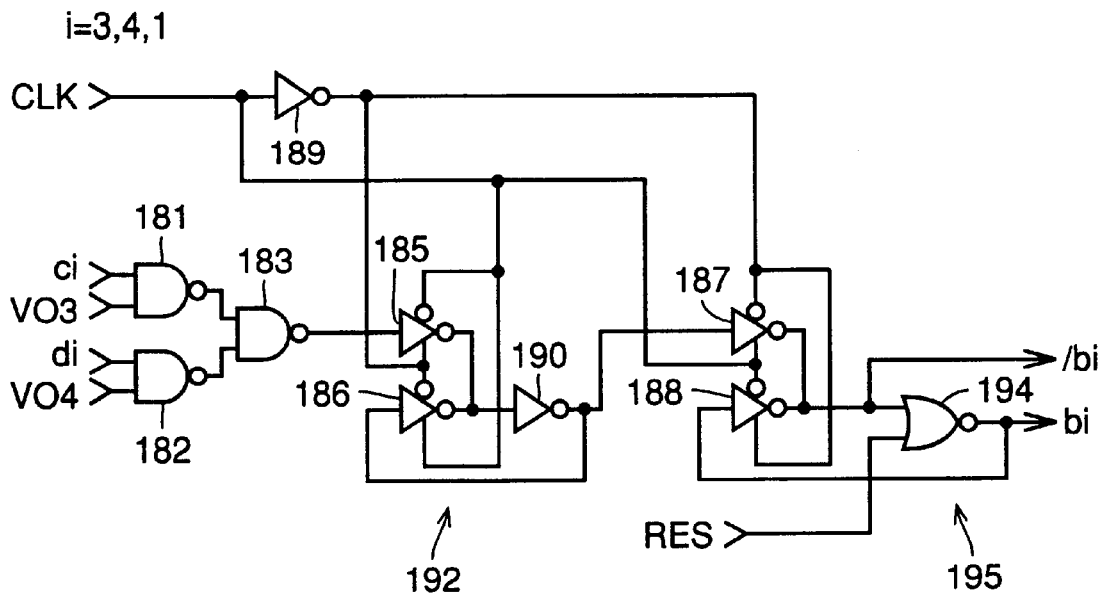

The circuit in FIG. 15B is a circuit to generate signals bi and /bi (i=3, 4, 1). NAND gate 181 receives signals ci and VO3, NAND gate 182 receives signals di and VO4, NOR gate 194 outputs signal bi, and clocked inverter 188 outputs signal /bi. The other construction is the same as that of the circuit shown in FIG. 14B.

Figure 16A:
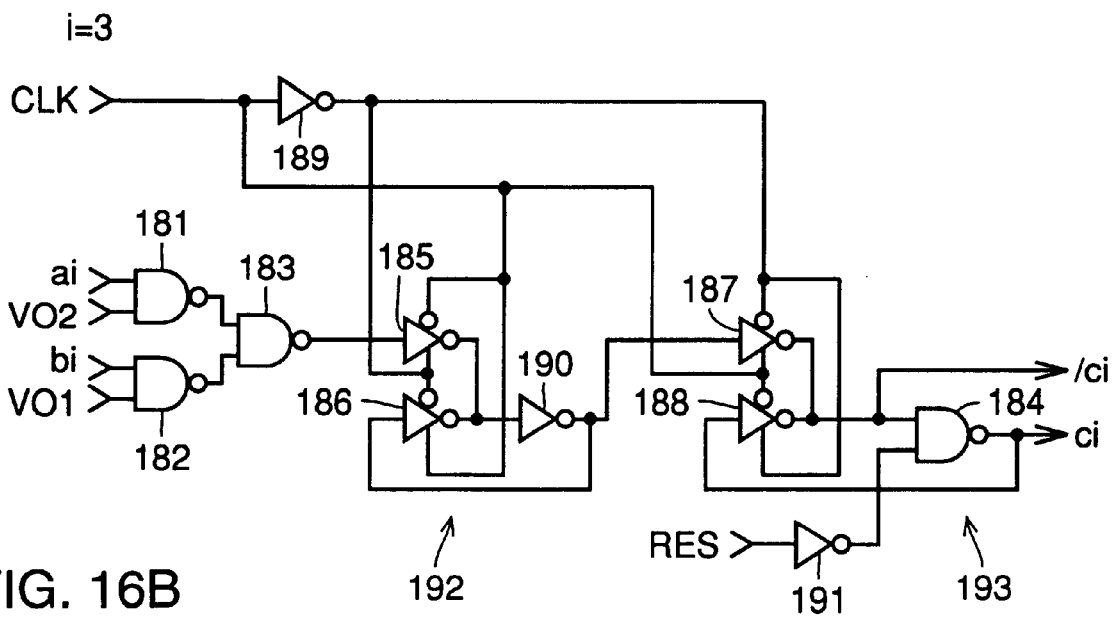
FIGS. 16A and 16B are circuit diagrams of circuits for generating signals ci and /ci shown in FIGS. 13A to 13D.

The circuit in FIG. 16A is a circuit to generate signals ci and /ci (i=3). NAND gate 181 receives signals ai and VO2, NAND gate 182 receives signals bi and VO1, NAND gate 184 outputs signal ci, and clocked inverter 188 outputs signal /ci. The other construction is the same as that of the circuit shown in FIG. 14A.

Figure 16B:
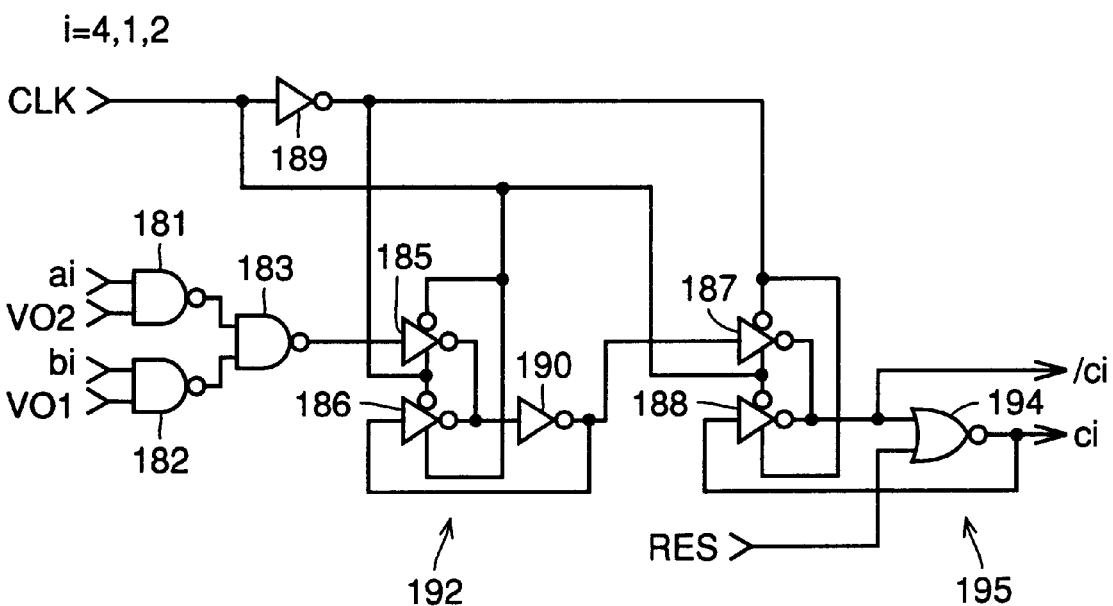

The circuit in FIG. 16B is a circuit to generate signals ci and /ci (i=4, 1, 2). NAND gate 181 receives signals ai and VO2, NAND gate 182 receives signals bi and VO1, NOR gate 194 outputs signal ci, and clocked inverter 188 outputs signal /ci. The other construction is the same as that of the circuit shown in FIG. 14B.

Figure 17A:
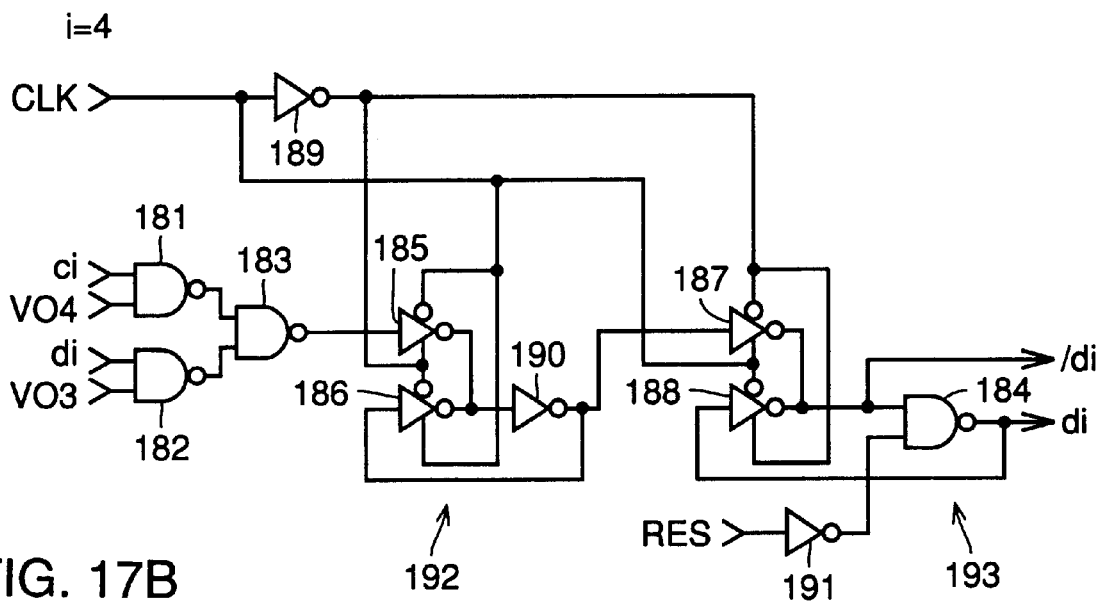
FIGS. 17A and 17B are circuit diagrams of circuits for generating signals di and /di shown in FIGS. 13A to 13D.

The circuit in FIG. 17A is a circuit to generate signals di and /di (i=4). NAND gate 181 receives signals ci and VO4, NAND gate 182 receives signals di and VO3, NAND gate 184 outputs signal di, and clocked inverter 188 outputs signal /di. The other construction is the same as that of the circuit shown in FIG. 14A.

Figure 17B:
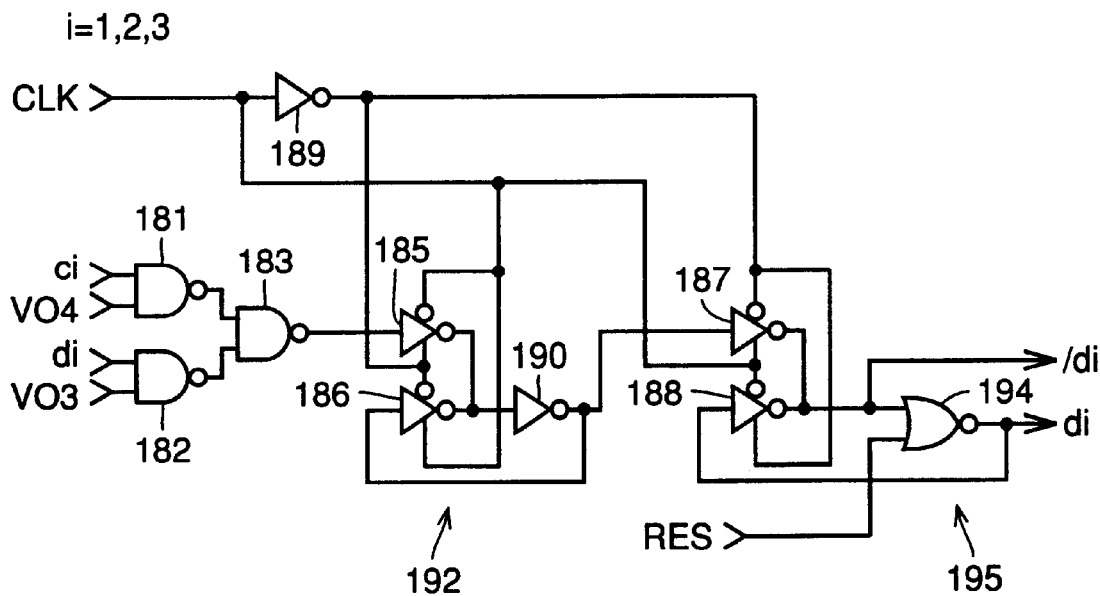
Figure 18:
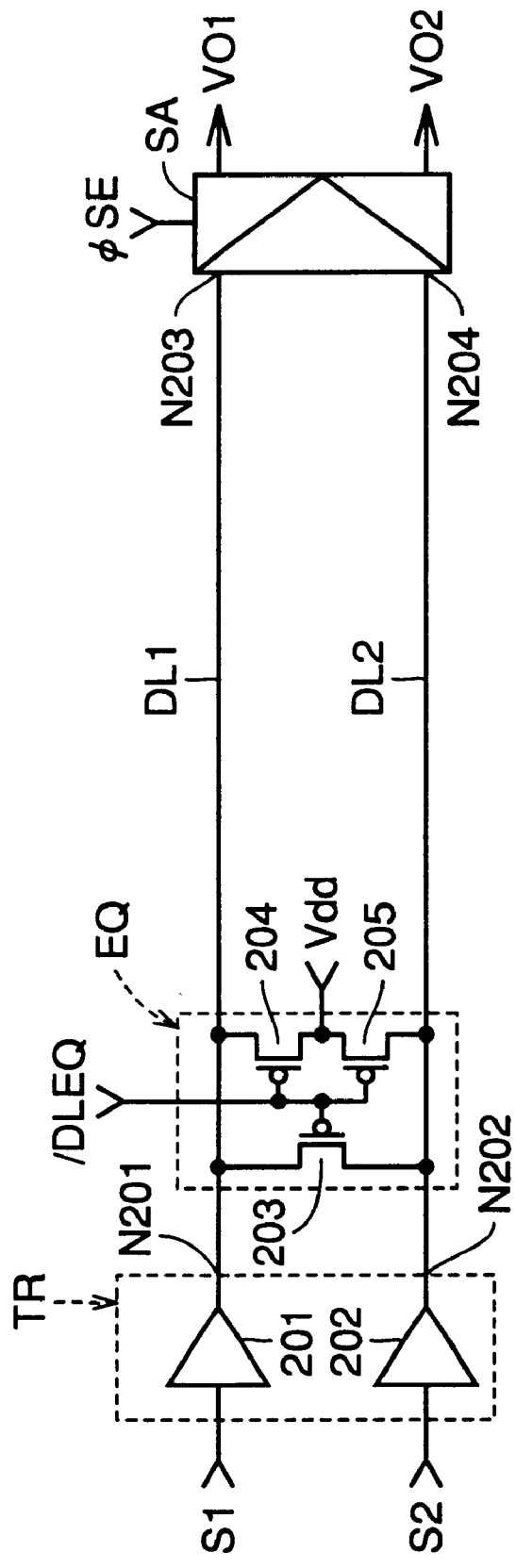
FIG. 18 is a circuit diagram of a data transfer circuit in a conventional semiconductor integrated circuit device.

The circuit in FIG. 17B is a circuit to generate signals di and /di (i=1, 2, 3). NAND gate 181 receives signals ci and VO4, NAND gate 182 receives signals di and VO3, NOR gate 194 outputs signal di, and clocked inverter 188 outputs signal /di. The other construction is the same as that of the circuit shown in FIG. 14B.

Now, NAND gates 181 to 183 will be described. Change in the connection of data lines DL1 to DL4 is determined based on the logic of signals ai to di already latched by latch circuits 193 and 195 and the logic of output signals VO1 to VO4 of sense amplifiers SA1 and SA2. In the circuits shown in FIGS. 14 to 17, in the logic when the connection of data lines DL1 to DL4 is changed before data transfer, "the data line at an "H" level between the two data lines connected to sense amplifier SA1 side is connected to node N31, and the data line at an "L" level is connected to node N33, while the data line at an "H" level between the two data lines connected to sense amplifier SA2 side is connected to node N32, and the data line at an "L" level is connected to node N34".

Now, the state in which signals ai to di and VO1 to VO4 are at an "H" level is expressed as "ai to di, VO1 to VO4=1", while the state in which signals ai to di, and VO1 to VO4 are at an "L" level is expressed as "ai to di, VO1 to VO4=0". If signals obtained after change in the connection are signals ai' to di', for signals ai' to a4' to determine a data line connected to node N31, a1'=a1·VO1+b1·VO2, a2'=a2·VO1+b2·VO2, a3'=a3·VO1+b3·VO2, and a4'=a4·VO1+b4·VO2 hold, in other words, ai'=ai·VO1+bi·VO2 holds.

Similarly, for signals b1' to di', bi'=ci·VO3+di·VO4, ci'=ai·VO2+bi·VO1, and di'=ci·VO4+di·VO3 hold. These expressions can be represented by three NAND gates 181 to 183 as shown in FIGS. 14 to 17. The change in the connection of the selectors is made by pulling clock signal CLK to an "H" level and rewriting the content held in latch circuit 193. Clock signal CLK is held at an "L" level during a data transfer period.

The other construction and operation are the same as those of the data transfer circuit shown in FIG. 1, and the description is not repeated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transfer circuit which transfers first and second data from a transmitting side circuit to a receiving side circuit, comprising:

four data lines provided between said transmitting side circuit and said receiving side circuit;

a first equalizer to bring each of two data lines among said four data lines to a first reference potential;

a second equalizer to bring each of two data lines among said four data lines to a second reference potential;

a transmitting circuit coupled to said transmitting side circuit to provide a potential difference between the two data lines equalized to said first reference potential and transmit said first data to said receiving side circuit and to provide a potential difference between the two data lines equalized to said second reference potential and transmit said second data to said receiving side circuit;

a selecting circuit which selects two data lines at a potential closer to said first reference potential than to said second reference potential as a first group and the other two data lines as a second group, after data transfer; and a coupling circuit which couples the two data lines in the first group selected by said selecting circuit and said first equalizer and couples the two data lines in said second group and said second equalizer.

2. The data transfer circuit according to claim 1, wherein said transmitting circuit brings one of the two data lines equalized to said first reference potential to said second reference potential to transmit said first data, and brings one of the two data lines equalized to said second reference potential to said first reference potential to transmit said second data.

3. The data transfer circuit according to claim 2, further comprising:

a first amplifying circuit coupled to said first equalizer to amplify a potential difference provided between the two data lines equalized to said first reference potential and bring one of said two data lines to said second reference potential and the other to said first reference potential; and a second amplifying circuit coupled to said second equalizer to amplify a potential difference provided between the two data lines equalized to said second reference potential and bring one of said two data lines to said first reference potential and the other to said second reference potential.

4. The data transfer circuit according to claim 2, wherein said selecting circuit comprises:

a first selecting circuit which compares the potential of a predetermined one of said four data lines and the potential of each of the other three data lines and selects one data line at the same potential as said predetermined data line among said the other three data lines, and a second selecting circuit which detects the potential of said predetermined data line, selects said predetermined data line and the data line selected by said first selecting circuit as said first group and the other two data lines as said second group if said predetermined data line is at said first reference potential, and selects said predetermined data line and the data line selected by said first selecting circuit as said second group and the other two data lines as said first group if said predetermined data line is at said second reference potential.

5. The data transfer circuit according to claim 2, wherein said transmitting circuit comprises first and second output nodes to transmit said first data and third and fourth output nodes to transmit said second data, said receiving side circuit comprises first and second input nodes to receive said first data and third and fourth input nodes to receive said second data, said first equalizer is coupled to said first and second input nodes, said second equalizer is coupled to said third and fourth input nodes, said coupling circuit comprises a first coupling circuit which couples one end of each of two data lines in said first group to said first and second output nodes and couples one end of each of two data lines in said second group to said third and fourth output nodes, and a second coupling circuit which couples the other end of each of two data lines in said first group to said first and second input nodes and the other end of each of two data lines in said second group to said third and fourth output nodes.

6. The data transfer circuit according to claim 5, wherein said first coupling circuit comprises a plurality of clocked inverters to couple one end of each of said four data lines to said first to fourth output nodes of said transmitting circuit, and said second coupling circuit comprises a plurality of transfer gates to couple the other end of each of said four data lines to said first to fourth input nodes.

7. The data transfer circuit according to claim 5, wherein said second coupling circuit comprises first to fourth transfer gates each provided corresponding to a data line and coupled between the other end of a corresponding data line and said first to fourth input nodes, respectively, said selecting circuit comprises a storing circuit to store information on which one of said first to fourth transfer gates conducts, and a control circuit which selects and turns on one of said first to fourth transfer gates based on the information stored by said storing circuit and the transferred first and second data.

* * * * *